(12) United States Patent
Pietz et al.

(10) Patent No.: US 12,517,285 B2
(45) Date of Patent: *Jan. 6, 2026

(54) MULTILAYER OPTICAL FILMS COMPRISING AT LEAST ONE FLUORINATED (CO)POLYMER LAYER MADE USING A FLUORINATED PHOTOINITIATOR, AND METHODS OF MAKING AND USING THE SAME

(71) Applicant: 3M INNOVATIVE PROPERTIES COMPANY, St. Paul, MN (US)

(72) Inventors: Brandon R. Pietz, St. Paul, MN (US); Christopher S. Lyons, St. Paul, MN (US); Paul J. Homnick, Lake Elmo, MN (US); Thomas P. Klun, Lakeland, MN (US); Jonathan M. Ryss, St. Paul, MN (US); Tabitha A. Silliman, Woodbury, MN (US); Tarris A. Sveback, New Richmond, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 506 days.

This patent is subject to a terminal disclaimer.

(21) Appl. No.: 17/997,683

(22) PCT Filed: May 15, 2021

(86) PCT No.: PCT/IB2021/054180
§ 371 (c)(1),
(2) Date: Nov. 1, 2022

(87) PCT Pub. No.: WO2021/229547
PCT Pub. Date: Nov. 18, 2021

(65) Prior Publication Data
US 2023/0108053 A1 Apr. 6, 2023

Related U.S. Application Data

(60) Provisional application No. 63/025,068, filed on May 14, 2020.

(51) Int. Cl.
*G02B 1/111* (2015.01)
(52) U.S. Cl.
CPC .................................. *G02B 1/111* (2013.01)
(58) Field of Classification Search
CPC .. G02B 1/111; G02B 1/00; G02B 1/04; G02B 1/10; G02B 1/11; G02B 1/12;
(Continued)

(56) References Cited

U.S. PATENT DOCUMENTS 3,250,808 A 5/1966 Moore, Jr. et al.
4,262,072 A 4/1981 Wendling et al.
(Continued)

FOREIGN PATENT DOCUMENTS

CN 106117394 B 6/2018
GB 2365430 A * 2/2002 ................ C07F 9/28
(Continued)

OTHER PUBLICATIONS

Supplementary Partial EP Search Report for EP Application No. 218038644, mailed on May 2, 2024, 6 pages.
(Continued)

*Primary Examiner* — Arnel C Lavarias

(57) ABSTRACT

Multilayer optical films including a substrate and at least a first layer overlaying a surface of the substrate, in which the at least first layer includes a (co)polymer obtained by polymerizing a polymerizable composition including a fluorinated photoinitiator and at least one free-radically polymerizable monomer, oligomer, or mixture thereof. Processes for making multilayer optical films using the polymerizable compositions also are taught. Articles including the multilayer optical film also are disclosed, in which the article preferably is selected from a photovoltaic device, a display device, a solid-state lighting device, a sensor, a medical or biological diagnostic device, or a combination thereof.

20 Claims, 3 Drawing Sheets

(58) Field of Classification Search
CPC .......... G02B 5/28; G02B 5/281; G02B 5/283; G02B 5/285; G02B 5/286; G02B 5/287; C07F 9/00; C07F 9/02; C07F 9/28; C07F 9/50; C07F 9/505; C07F 9/53; C07D 301/00; C07D 301/02; C07D 303/00; C07D 303/02; C07D 303/08
USPC ....... 359/586, 577, 580, 582, 585, 588, 589, 359/590; 522/1, 6, 178; 428/411.1; 549/200, 512, 513, 518, 521
See application file for complete search history.

(56) References Cited

U.S. PATENT DOCUMENTS

| | | | |
|---|---|---|---|
| 4,378,250 A | 3/1983 | Treadway et al. | |
| 4,696,719 A | 9/1987 | Bischoff | |
| 4,722,515 A | 2/1988 | Ham | |
| 4,842,893 A | 6/1989 | Yializis et al. | |
| 4,954,371 A | 9/1990 | Yializis | |
| 5,018,048 A | 5/1991 | Shaw et al. | |
| 5,032,461 A | 7/1991 | Shaw et al. | |
| 5,097,800 A | 3/1992 | Shaw et al. | |
| 5,125,138 A | 6/1992 | Shaw et al. | |
| 5,391,587 A | 2/1995 | Wu | |
| 5,440,446 A | 8/1995 | Shaw et al. | |
| 5,461,173 A | 10/1995 | Sato et al. | |
| 5,547,908 A | 8/1996 | Furuzawa et al. | |
| 5,811,183 A | 9/1998 | Shaw et al. | |
| 5,877,895 A | 3/1999 | Shaw et al. | |
| 5,945,174 A | 8/1999 | Shaw et al. | |
| 6,045,864 A | 4/2000 | Lyons et al. | |
| 6,172,810 B1 | 1/2001 | Fleming et al. | |
| 6,214,422 B1 | 4/2001 | Yializis | |
| 6,224,219 B1 | 5/2001 | Fleming et al. | |
| 6,231,939 B1 | 5/2001 | Shaw et al. | |
| 6,579,663 B2 * | 6/2003 | Wolf | C07F 9/5337 522/18 |
| 6,815,043 B2 | 11/2004 | Fleming et al. | |
| 6,838,183 B2 | 1/2005 | Yializis et al. | |
| 6,929,864 B2 | 8/2005 | Fleming et al. | |
| 7,018,713 B2 | 3/2006 | Padiyath et al. | |
| 7,215,473 B2 | 5/2007 | Fleming | |
| 7,335,786 B1 | 2/2008 | Yer et al. | |
| 7,547,476 B2 | 6/2009 | Jones et al. | |
| 7,718,264 B2 | 5/2010 | Klun et al. | |
| 7,745,653 B2 | 6/2010 | Iyer et al. | |
| 7,825,272 B2 | 11/2010 | Iyer et al. | |
| 8,729,211 B2 | 5/2014 | Klun et al. | |
| 8,748,060 B2 | 6/2014 | Qiu | |
| 8,883,872 B2 | 11/2014 | Gruützmacher et al. | |
| 9,587,127 B2 | 3/2017 | Herlihy et al. | |
| 9,718,896 B2 | 8/2017 | Hari et al. | |
| 9,718,961 B2 | 8/2017 | Corveleyn et al. | |
| 9,790,396 B2 | 10/2017 | Klun et al. | |
| 10,227,688 B2 | 3/2019 | Roehrig et al. | |
| 2004/0032658 A1 | 2/2004 | Fleming | |
| 2005/0182199 A1 | 8/2005 | Jing et al. | |
| 2006/0147177 A1 | 7/2006 | Jing et al. | |
| 2006/0274423 A1 * | 12/2006 | Fukushige | G02B 1/111 359/659 |
| 2007/0286993 A1 | 12/2007 | Radcliffe et al. | |
| 2010/0129672 A1 | 5/2010 | Hao et al. | |
| 2010/0130687 A1 | 5/2010 | Tu | |
| 2010/0232021 A1 * | 9/2010 | Walker, Jr | G02B 1/111 428/323 |
| 2011/0109966 A1 | 5/2011 | Yu et al. | |
| 2015/0248055 A1 | 9/2015 | Fall et al. | |
| 2015/0274889 A1 | 10/2015 | Sakoh et al. | |
| 2016/0306084 A1 | 10/2016 | Padiyath et al. | |
| 2018/0138433 A1 | 5/2018 | Klun et al. | |
| 2018/0196167 A1 * | 7/2018 | Fujikawa | B32B 27/08 |
| 2019/0144696 A1 | 5/2019 | Loccufier | |
| 2019/0233587 A1 | 8/2019 | Ishizeki et al. | |
| 2023/0129152 A1 * | 4/2023 | Klun | C07C 271/16 427/508 |
| 2023/0174564 A1 * | 6/2023 | Homnick | G03F 7/029 428/412 |
| 2023/0220172 A1 * | 7/2023 | Pietz | G02B 5/287 264/1.34 |

FOREIGN PATENT DOCUMENTS

| | | |
|---|---|---|
| JP | 2007011309 A | 1/2007 |
| JP | 3944957 B2 | 7/2007 |
| JP | 2007213045 A | 8/2007 |
| KR | 20100121283 A | 11/2010 |
| KR | 20100121284 A | 11/2010 |
| WO | 2000026973 A1 | 5/2000 |
| WO | 2003089239 A1 | 10/2003 |
| WO | 2004016689 A1 | 2/2004 |
| WO | 2005061638 A1 | 7/2005 |
| WO | 2005113642 A1 | 12/2005 |
| WO | 2006073785 A1 | 7/2006 |
| WO | 2006073918 A1 | 7/2006 |
| WO | 2006102383 A1 | 9/2006 |
| WO | 2008083304 A2 | 7/2008 |
| WO | 2011005443 A2 | 1/2011 |
| WO | 2011096371 A1 | 8/2011 |
| WO | 2012003198 A2 | 1/2012 |
| WO | 2012003416 A1 | 1/2012 |
| WO | 2012003417 A1 | 1/2012 |
| WO | 2012054685 A2 | 4/2012 |
| WO | 2012096899 A1 | 7/2012 |
| WO | 2012106184 A2 | 8/2012 |
| WO | 2014025384 A1 | 2/2014 |
| WO | 2014025385 A1 | 2/2014 |
| WO | 2014025387 A1 | 2/2014 |
| WO | 2014025570 A1 | 2/2014 |
| WO | 2014025983 A1 | 2/2014 |
| WO | 2015111765 A1 | 7/2015 |
| WO | 2017191043 A1 | 11/2017 |
| WO | 2020049378 A1 | 3/2020 |
| WO | 2020095258 A1 | 5/2020 |
| WO | 2020097319 A1 | 5/2020 |
| WO | 2021229331 A1 | 11/2021 |
| WO | 2021229338 A1 | 11/2021 |
| WO | 2021229340 A1 | 11/2021 |
| WO | 2021229348 A1 | 11/2021 |
| WO | 2021229547 A1 | 11/2021 |
| WO | 2021231068 A1 | 11/2021 |

OTHER PUBLICATIONS

Affinito, "Polymer-Oxide Transparent Barrier Layers", Society of Vacuum Coaters, 39th Annual Technical Conference Proceedings, 1996, pp. 392-397.
Affinito, "Vacuum Deposited Polymer/Metal Multilayer Films for Optical Application", Thin Solid Films, Dec. 1995, vol. 270, No. 1-2, pp. 43-48.
Dietlin, "Rational Design of Acyldiphenylphosphine Oxides as Photoinitiators of Radical Polymerization", Macromolecules, 2019, vol. 52, No. 20, pp. 7886-7893.
Hilfiker, "Spectroscopic Ellipsometry Characterization of Coatings on Biaxially Anisotropic Polymeric Substrates" Applied Surface Science, Nov. 2017, vol. 421, pp. 500-507.
Kemura, "UV-VIS Spectra and Photoinitiation Behaviors of Acylphosphine Oxide and Bisacylphosphine Oxide Derivatives in Unfilled, Light-Cured Dental Resins", Dental Materials Journal, 2008, vol. 27, No. 6, pp. 765-774.
International Search Report for PCT Application No. PCT/IB2021/053475, mailed on Aug. 26, 2021, 4 pages.
International Search Report for PCT Application No. PCT/IB2021/053542, mailed on Sep. 28, 2021, 5 pages.
International Search Report for PCT Application No. PCT/IB2021/054180, mailed on Oct. 19, 2021, 5 pages.
International Search Report for PCT Application No. PCT/IB2021/53473, mailed on Jul. 27, 2021, 3 pages.
Li, "Visible Photocatalysis of Novel Oxime Phosphonates: Synthesis of B-Aminophosphonates", Chemical Communications, 2019, vol. 55, No. 79, pp. 11888-11891.

(56) References Cited

OTHER PUBLICATIONS

Lindner, "Behavior of (Halogeno) Acylphosphines Towards Molecular Oxygen in Dependence of the Acyl Residue", Zeitschrift für Naturforschung B, 1978, pp. 849-854.

Roehrig, "Use of Evaporated Acrylate Coatings to Smooth the Surface of Polyester and Polypropylene Film Substrates", Journal of Plastic Film & Sheeting, Jul. 1997, vol. 13, pp. 235-251.

Samanta, "Organocatalytic Enantioselective Synthesis of Both Diastereomers of α-Hydroxyphosphinates", The Journal of Organic Chemistry, Jan. 2010, vol. 75, pp. 1101-1106.

Shaw, "A New High-Speed Process for Vapor Depositing Acrylate Thin Films: An Update", Society of Vacuum Coaters, 36th Annual Technical Conference Proceedings, 1993, pp. 348-351.

Shaw, "A New Vapor Deposition Process for Coating Paper and Polymer Webs", Technical Paper Presented at 6th International Vacuum Coating Conference, Oct. 1992, pp. 18-24.

Shaw, "Use of Vapor Deposited Acrylate Coatings to Improve the Barrier Properties of Metallized Film", Society of Vacuum Coaters, 37th Annual Technical Conference Proceedings, 1994, pp. 240-247.

Swanson, "Measurement of Web Curl", Presented in Applied Web Handling Conference Proceedings, 2006, 21 pages.

Zasukha, "Nucleophilic Fluorination of α-Aroylphosphinates with Morpholinosulfur Trifluoride", Heteroatom Chemistry, 2014, vol. 25, No. 4, pp. 256-264.

\* cited by examiner

MULTILAYER OPTICAL FILMS COMPRISING AT LEAST ONE FLUORINATED (CO)POLYMER LAYER MADE USING A FLUORINATED PHOTOINITIATOR, AND METHODS OF MAKING AND USING THE SAME

CROSS REFERENCE TO RELATED APPLICATIONS

This application is a national stage filing under 35 U.S.C. 371 of PCT/IB2021/054180, filed May 15, 2021, which claims the benefit of U.S. Provisional Patent Application No. 63/025,068, filed May 14, 2020, the disclosure of which is incorporated by reference in its/their entirety herein.

TECHNICAL FIELD

The present disclosure relates to polymerizable compositions including fluorinated photoinitiators and methods of using fluorinated photoinitiators to form fluorinated (co)polymer layers in multilayer optical films.

BACKGROUND

Crosslinked (co)polymeric layers have been used in thin films for electrical, packaging and decorative applications. These layers can provide desired properties such as desired optical properties, mechanical strength, thermal resistance, chemical resistance, abrasion resistance, transparency, refractive index, and clarity. Multilayer optical films incorporating crosslinked (co)polymeric layers also are known.

Such multilayer optical films can be prepared using a variety of production methods. These methods include liquid coating techniques such as solution coating, roll coating, dip coating, spray coating, spin coating; and dry coating techniques such as Monomer Evaporation and Cure, Chemical Vapor Deposition (CVD), Plasma Enhanced Chemical Vapor Deposition (PECVD), initiated Chemical Vapor Deposition (iCVD), Plasma Polymerization, and Molecular Layer Deposition (MLD). One approach for producing multilayer optical films has been to produce inorganic optical layers, such as aluminum oxide, silicon oxide, titanium oxide or silicon nitride interspersed with (co)polymeric optical layers. The inorganic layers can be deposited using a variety of methods including CVD, PECVD, Atomic Layer Deposition (ALD), sputtering and vacuum processes for thermal or electron beam evaporation of solid materials.

Examples of such multilayer optical films and processes for forming such films can be found, for example, in U.S. Pat. No. 5,877,895 (Shaw, et al.); U.S. Pat. No. 6,815,043 (Fleming, et al.); U.S. Pat. No. 6,838,183 (Yializis); U.S. Pat. No. 6,929,864 (Fleming, et al.); U.S. Pat. No. 7,215,473 (Fleming); US20160306084 (Padiyath, et al.) These multilayer optical films have a number of applications in the display, optics, lighting, chemical sensor, biological sensor/diagnostic, and solar markets.

SUMMARY

The optical performance of a multilayer optical film depends on the difference in refractive index between layers. It is often desirable to maximize this difference by using two materials of significantly different refractive index—a low refractive index material and a high refractive index material. Prior art multilayer optical films often use inorganic $MgF_2$ as the low refractive index layer (n=1.38 at 550 nm) or use polymeric coatings with index around 1.5 as low refractive index layers. This disclosure describes the use of low refractive index fluorinated (co)polymer layers with fluorinated photoinitiators to realize polymer low refractive index layers with refractive index less than 1.4, optionally wherein the refractive index is from 1.3 to 1.4.

It also can be challenging to bond low surface energy, highly fluorinated (co)polymer layers to high surface energy surfaces like inorganic oxides (e.g., silica) in a way that creates a mechanically-robust film that does not delaminate upon processing or handling. The fluorinated coupling agent needs to have reactive groups that are compatible with the curing chemistry used to deposit the highly fluorinated (co)polymer layer(s). While there are many wetting or compatibilizing agents known to improve formation and bonding of fluorinated (co)polymer layers on inorganic layers (e.g., inorganic layers such as silica), these agents generally are not known to impart fluoromaterial compatibility, for example, good adhesion of the highly fluorinated (co)polymer layer to the inorganic surface.

This disclosure describes the use of fluorinated photoinitiators to produce fluorinated (co)polymers useful in multilayer optical film applications. These fluorinated photoinitiators are generally (1) soluble in and compatible with fluorinated monomers, oligomers, and polymers, (2) able to rapidly initiate free radical polymerization upon irradiation with actinic radiation such as ultraviolet or visible (UV-VIS) light, (3) also able to rapidly chemically bond to radical-polymerizable fluorinated monomers, oligomers, and (co)polymers (e.g., hexafluoro propylene oxide (HFPO)-diacrylate monomers, oligomers and (co)polymers) and (4) not known to cause a substantial increase in the low refractive index of the formed fluorinated (co)polymer layers. The combination of these properties makes these fluorinated photoinitiators useful for creating robust, chemically-bonded, fluorinated low refractive index (co)polymer layers for multilayer optical films.

The fluorinated photoinitiators have one of the following formulas:

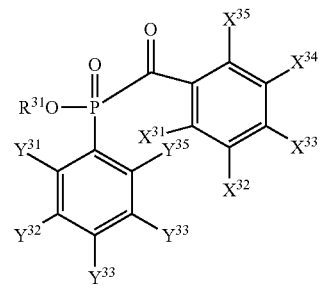

wherein:
$X^{31}$, $X^{32}$, $X^{33}$, $X^{34}$, $X^{35}$ are each independently selected from —H, —F, or —$CF_3$, with the proviso that at least 3 of $X^{31}$, $X^{32}$, $X^{33}$, $X^{34}$, $X^{35}$ are —F, or that at least 1 of $X^{31}$, $X^{32}$, $X^{33}$, $X^{34}$, $X^{35}$ is —$CF_3$;
$Y^{31}$, $Y^{32}$, $Y^{33}$, $Y^{34}$, $Y^{35}$ are each independently selected from —H, or $CH_3$; and
$R^{31}$ is an alkyl group of 1 to 4 carbon atoms;
or $R_f$—[C(O)NH—$R^1$—N($R^2$)—$CH_2CH_2$—C(O)—X-L-PI)]$_n$ wherein
- $R_f$ is a monovalent perfluorooxyalkyl group or divalent perfluorooxyalkylene group;
- $R^1$ is an alkylene group optionally containing one or more catenary oxygen or nitrogen atoms,
- $R^2$ is H or an alkyl group of 1 to 4 carbon atoms,
- X is —O—, —S—, or —NR$^3$—, wherein $R^3$ is H or an alkyl group of 1 to 4 carbon atoms,
- L is a covalent bond or divalent organic linking group;
- PI is a photoinitiator group;
- n is 1 when $R_f$ is a monovalent perfluorooxyalkyl group or n is 2 when $R_f$ is a divalent perfluorooxyalkylene group.

The fluorinated photoinitators are generally used effectively in a polymerizable composition comprising a mixture of at least one of the foregoing fluorinated photoinitiators, and at least one free-radically polymerizable monomer, oligomer, or mixture thereof.

Thus, in one aspect, the disclosure describes a multilayer optical film comprising a substrate and at least a first layer overlaying a surface of the substrate, wherein the first layer comprises a (co)polymer obtained by polymerizing the foregoing polymerizable compositions including at least one of the foregoing fluorinated photoinitiators and optionally at least one fluorinated coupling agent.

In a further aspect, the disclosure describes an article comprising a multilayer optical film according to the foregoing embodiments, wherein the article is selected from a photovoltaic device, a display device, a solid-state lighting device, a sensor, a medical or biological diagnostic device, an electrochromic device, light control device, or a combination thereof.

In still another aspect, the disclosure describes a process for making a multilayer optical film, the process comprising forming at least one (co)polymer layer overlaying a substrate, wherein the (co)polymer layer comprises the reaction product of the foregoing polymerizable compositions, and applying at least one additional optical layer overlaying the substrate, optionally wherein the additional optical layer comprises an inorganic oxide, nitride, oxynitride, or oxycarbide; metal or metal alloy; a, (co)polymer, or a combination thereof.

Exemplary embodiments of the present disclosure provide multilayer optical films which exhibit improved flexibility and optical performance and low stress. Exemplary embodiments of multilayer optical films according to the present disclosure are preferably optically responsive to visible, UV, and/or infrared light. Exemplary embodiments of multilayer optical films according to the present disclosure generally do not exhibit delamination, or curl, or crazing that can arise from thermal stresses or deposition stresses in a multilayer optical all-inorganic structure.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The accompanying drawings are incorporated in and constitute a part of this specification and, together with the description, explain the advantages and principles of exemplary embodiments of the present disclosure.

Like reference numerals in the drawings indicate like elements. The drawings herein are not drawn to scale, and in the drawings, the illustrated elements are sized to emphasize selected features.

DETAILED DESCRIPTION

Glossary

Figure 1:
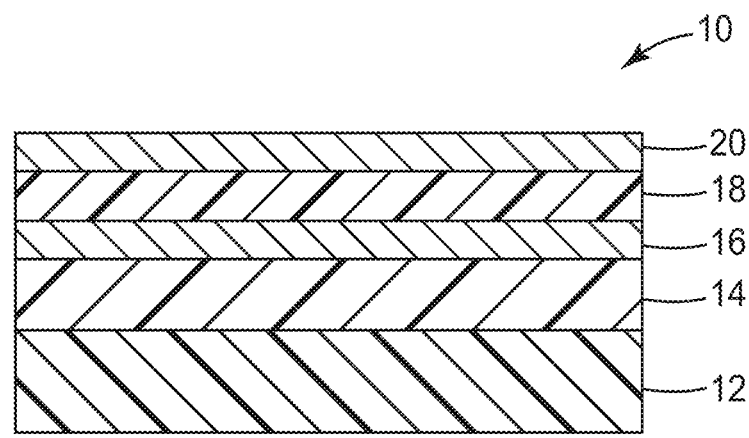
FIG. 1 is a diagram illustrating an exemplary multilayer optical film incorporating a (co)polymer layer formed using a fluorinated photoinitiator according to an exemplary embodiment of the present disclosure.

Certain terms are used throughout the description and the claims that, while for the most part are well known, may require some explanation. It should understood that, as used herein, By using the terms "overcoated," "overlay" and "overlaying" to describe the position of a layer with respect to a substrate or other layer of a multilayer film of the present disclosure, we refer to the layer as being atop the substrate or other layer, but not necessarily adjoining or contiguous with the substrate or layer.

By using the term "separated by" to describe the position of a layer with respect to one or more other layers, we refer to the other layers as being between the layer and the substrate or another different layer, but not necessarily but not necessarily adjoining or contiguous with the substrate or different layer.

The terms "(co)polymer" and "polymer" include homopolymers and copolymers, such as homopolymers or copolymers that may be formed in a miscible blend, e.g., by coextrusion or by reaction, including, e.g., transesterification. The term "copolymer" includes both random and block copolymers.

The term "coupling agent" means a compound which provides a chemical bond between two dissimilar materials, usually an inorganic and an organic material. Coupling agents are typically multi-functional molecules or oligomers which can act to effect crosslinking during chemical reactions, for example, a chemical reaction such as free radical polymerization to form a (co)polymer.

The term "film" or "layer" refers to a single stratum within a multilayer film.

The term "(meth)acryl" or "(meth)acrylate" with respect to a monomer, oligomer, (co)polymer or compound means a vinyl-functional alkyl ester formed as the reaction product of an alcohol with an acrylic or a methacrylic acid.

The term "crosslinked" (co)polymer refers to a (co)polymer whose (co)polymer chains are joined together by covalent chemical bonds, usually via crosslinking molecules or groups, to form a network (co)polymer. A crosslinked (co)polymer is generally characterized by insolubility but may be swellable in the presence of an appropriate solvent.

The term "cure" refers to a process that causes a chemical change, e.g., a reaction that creates a covalent bond to solidify a layer or increase its viscosity.

The term "cured (co)polymer" includes both crosslinked and uncrosslinked polymers.

The term "low refractive index" means a material or layer having a refractive index from 1.3 to 1.5.

The term "high refractive index" means a material or layer having a refractive index from 1.5-2.5.

The term "metal" includes a pure metal or a metal alloy.

The term "photoinitiator" means a material and more particularly a molecule that creates reactive species (e.g., free radicals, cations or anions) when exposed to actinic radiation (e.g., ultraviolet (UV), visible (VIS) or infrared (IR) light).

The term "vapor coating" or "vapor depositing" means applying a coating to a substrate surface from a vapor phase, for example, by evaporating and subsequently depositing onto the substrate surface a precursor material to the coating or the coating material itself. Exemplary vapor coating processes include, for example, physical vapor deposition (PVD), chemical vapor deposition (CVD), and combinations thereof.

By using the term "visible light-transmissive" with respect to a support, layer, assembly, article or device, we mean that the support, layer, assembly or device has an average transmission over the visible portion of the spectrum, $T_{vis}$, of at least about 20%, measured along the normal axis.

Multilayer optical films with low refractive index polymer layer(s) are desirable for optical devices and light management films. A multilayer optical film or coating with low refractive index polymer layer(s) may provide advantages over all-inorganic multilayer optical coatings as it is flexible, lightweight, durable, not sensitive to moisture and enables low cost continuous roll-to-roll processing.

Low refractive index inorganic layers (e.g., MgF2) in multilayer optical films often have internal stress and sensitivity to moisture. The deposition rate via thermal or electron beam evaporation of inorganic low refractive index material is relatively low compared to the high speed deposition of organic monomer layers as described in U.S. Pat. No. 4,842,893 (Yializis, et al.). Thermal or electron beam evaporation is difficult to scale up for roll wide web applications requiring very uniform coatings (e.g., optical coatings) and can require substrate heating to obtain quality coatings. Additionally, evaporation/sublimation processes can require ion-assist, which is generally limited to small areas, to improve the coating quality.

(Meth)acrylate monomers enable high speed coating processes when cured with UV or visible (actinic) light sources. Nonfluorinated acrylate materials make us of nonfluorinated photoinitiators to initiate the polymerization of these materials upon exposure to actinic radiation. However, these nonfluorinated photoinitiators are not soluble in highly fluorinated monomers, causing phase separation, haze, and nonuniformity of properties in coatings of these materials. Thus, there is a need for photoinitiators that are soluble in fluorinated monomers and can promote free radical polymerization of these monomers.

Fluorinated Photoinitiators

The fluorinated photoinitiators of the present disclosure have one of the following formulas:

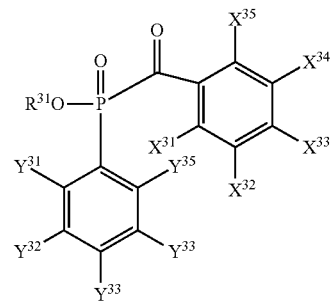

wherein:

$X^{31}$, $X^{32}$, $X^{33}$, $X^{34}$, $X^{35}$ are each independently selected from —H, —F, or —CF$_3$, with the proviso that at least 3 of $X^{31}$, $X^{32}$, $X^{33}$, $X^{34}$, $X^{35}$ are —F, or that at least 1 of $X^{31}$, $X^{32}$, $X^{33}$, $X^{34}$, $X^{35}$ is —CF$_3$;

$Y^{31}$, $Y^{32}$, $Y^{33}$, $Y^{34}$, $Y^{35}$ are each independently selected from —H, or CH$_3$; and $R^{31}$ is an alkyl group of 1 to 4 carbon atoms;

or

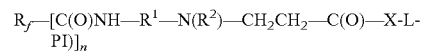

wherein $R_f$ is a monovalent perfluorooxyalkyl group or divalent perfluorooxyalkylene group;

$R^1$ is an alkylene group optionally containing one or more catenary oxygen or nitrogen atoms, $R^2$ is H or an alkyl group of 1 to 4 carbon atoms, X is —O—, —S—, or —NR$^3$—, wherein R$^3$ is H or an alkyl group of 1 to 4 carbon atoms, L is a covalent bond or divalent organic linking group;

PI is a photoinitiator group;

n is 1 when $R_f$ is a monovalent perfluorooxyalkyl group or n is 2 when $R_f$ is a divalent perfluorooxyalkylene group.

In some exemplary embodiments, the fluorinated photoinitiator of formula:

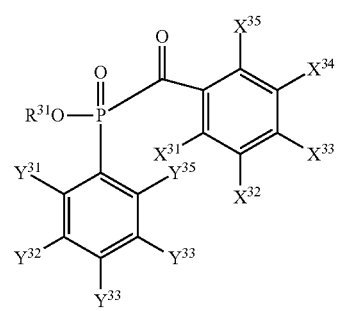

has a calculated molecular weight of no greater than 700, 600, 500, or 400 g/mole.

In other exemplary embodiments, the fluorinated photoinitiator of formula:

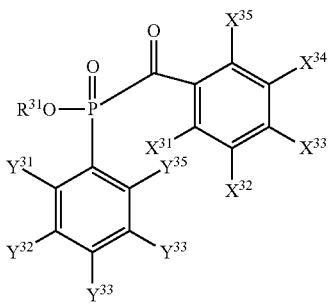

has a fluorine content of at least 10, 15, 20, 25, 30, 35, or 40 wt. %.

In further exemplary embodiments, the fluorinated photoinitiator of formula:

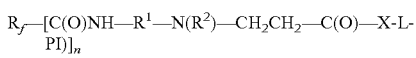

has a calculated number average molecular weight of no greater than 3000, 2500, 2000, 150, 1000, or 500 g/mole.

In additional exemplary embodiments, the fluorinated photoinitiator of formula:

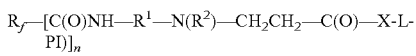

has a fluorine content of at least 30, 35, or 40 wt. %.

Suitable fluorinated photoinitiators and methods of making and using such fluorinated photoinitiators are disclosed in the following co-pending, co-filed U.S. Pat. applications, the entire disclosures of which are hereby incorporated by reference herein:
63/024,572, titled "COMPOUNDS COMPRISING PERFLUORINATED GROUP, PHOTOINITIATOR GROUP, AND AMIDE LINKING GROUP"
and
63/025,134, , titled "FLUORINATED PHOTOINITIATORS AND FLUORINATED (CO)POLYMER LAYERS MADE USING THE SAME"

Optional Fluorinated Coupling Agents

The optional fluorinated coupling agents of the present disclosure have one of the following formulas:

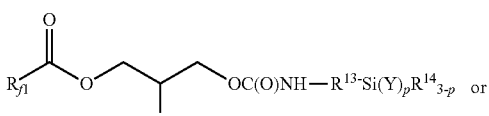

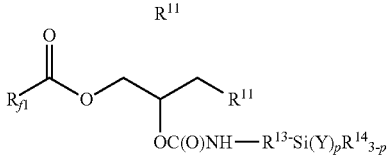

wherein:
$R_{f1}$ is a monovalent perfluorooxyalkyl;
$R^{13}$ is a divalent alkylene group, said alkylene groups optionally containing one or more catenary oxygen atoms;
$R^{11}$ is $-[OC(O)-NH-R^{13}]_{m1}OC(O)CR^{15}=CH_2$ or $-OC(O)-NH-R^{16}(-OC(O)CR^{15}=CH_2)_2$;
Y is a hydrolysable group;
$R^{14}$ is a monovalent alkyl or aryl group;
p is 1, 2, or 3;

$R^{15}$ is H or $CH_3$;
$R^{16}$ is a polyvalent alkylene group, said polyvalent alkylene group optionally containing one or more catenary oxygen atoms; and
m1 is 1 or 0;
or

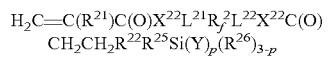

wherein:
$R^{21}$ is H or $CH_3$;
$X^{22}$ is $-O-$, $-S-$, or $-NR^{23}-$ wherein $R^{23}$ is H or an alkyl group of 1 to 4 carbon atoms,
$L^{21}$ and $L^{22}$ are organic linking groups;
$R_f$ is a divalent perfluorooxyalkylene;
$R^{22}$ is $-S-$ or $-N(R^{24})-$ wherein $R^{24}$ is $C_1$-$C_4$ alkyl or $-R^{25}Si(Y)_3$;
$R^{25}$ is a divalent alkylene group optionally comprising one or more catenary oxygen atoms;
Y is a hydrolysable group;
$R^{26}$ is a non-hydrolysable group; and
p is 1, 2, or 3;
or

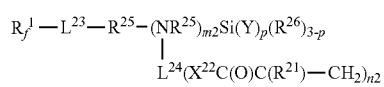

wherein:
$R_f^1$ is a monovalent perfluorooxyalkyl;
$L^{23}$ and $L^{24}$ are organic linking groups;
$R^{25}$ is a divalent alkylene group said alkylene groups optionally containing one or more catenary oxygen atoms;
Y is a hydrolysable group;
$R^{26}$ is a non-hydrolysable group;
p is 1, 2, or 3;
$X^{22}$ is $-O-$, $-S-$, or $-NR^3-$, wherein $R^{23}$ is H or an alkyl group of 1 to 4 carbon atoms;
$R^{21}$ is H or $CH_3$;
m2 is 1 or 2; and
n2 is 1, 2, or 3.

Suitable fluorinated coupling agents and methods of making and using such fluorinated coupling agents are disclosed in the following co-pending, co-filed U.S. Pat. applications, the entire disclosures of which are incorporated by reference herein:
63/024,633, titled "POLYMERIZABLE COMPOSITIONS AND COMPOUNDS COMPRISING PERFLUORINATED GROUP, HYDROLYSABLE SILANE GROUP, AND (METH)ACRYL GROUP"
and
63/025,102, , titled "FLUORINATED COUPLING AGENTS AND FLUORINATED (CO)POLYMER LAYERS MADE USING THE SAME"

Polymerizable Compositions

The fluorinated photoinitiators are generally used effectively in a polymerizable composition comprising a mixture of at least one of the foregoing fluorinated photoinitiators and at least one free-radically polymerizable monomer, oligomer, or mixture thereof, and optionally at least one of the foregoing fluorinated coupling agents.

Preferably, at least one of the free-radically polymerizable monomers or oligomers is at least partially fluorinated.

In some exemplary embodiments, the polymerizable composition is comprised of the fluorinated photoinitiator of the formula:

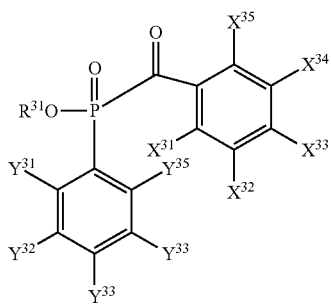

in an amount no more than about 10.0, 7.5, 5.0, 4.0 or 3.0 wt. % based on the weight of the polymerizable composition.

In still other exemplary embodiments, the polymerizable composition is comprised of the fluorinated photoinitiator $R_f$—[C(O)NH—$R^1$—N($R^2$)—$CH_2CH_2$—C(O)—X-L-PI)]$_n$ in an amount no more than about 50.0, 40.0, 30.0, 20.0, 15.0, 10.0, 7.5, 5.0, 4.0 or 3.0 wt. % based on the weight of the polymerizable composition.

Multilayer Optical Films

In exemplary embodiments, the disclosure describes a multilayer optical film comprising a substrate and at least a first layer overlaying a surface of the substrate, wherein the first layer comprises a (co)polymer obtained by polymerizing (e.g., free radical polymerization) at least one of the foregoing polymerizable compositions including at least one free-radically polymerizable monomer, oligomer, or mixture thereof and at least one of the foregoing fluorinated coupling agents, optionally including at least one of the foregoing fluorinated photoinitiators.

In some exemplary embodiments, the multilayer optical film further comprises a plurality of alternating optical layers comprised of a high refractive index optical layer overlaying the substrate and comprising an inorganic oxide, nitride, oxynitride, oxycarbide a metal or metal alloy; a (co)polymer, or a combination thereof; and an adjoining optical layer overlaying the substrate and comprising a (co)polymer.

In some advantageous embodiments, at least one of the substrate, the at least first optical layer, the at least second optical layer, or a combination thereof, further comprises a plurality of nanostructures or microstructures. In certain such embodiments, the height of the nano-scale features is at least five times larger than the width of the nano-scale features. Preferably, the width of each of the nanoscale features is less than 1,000 nm, 750 nm, 500 nm, 400 nm, 300 nm, 200 nm or even 100 nm.

In certain advantageous embodiments, the nano-scale features comprise at least one of a plurality of holes, a plurality of pillars, a plurality of recesses having a substantially flat bottom surface, a plurality of flat-topped plateau features, or a plurality of three-dimensional polygonal structures. In some such embodiments, the depth of 90% of the nano-scale features is within +/−20 nm of a selected etch depth, which may be advantageously pre-selected.

Suitable methods and apparatus for producing such nanoscale features are disclosed in the U.S. Pat. application Ser. Nos. 62/759,914 (filed Nov. 12, 2018) and 62/928,742 (filed Oct. 31, 2019), both titled "MATERIALS AND METHODS FOR FORMING NANO-STRUCTURES ON SUBSTRATES," the entire disclosure of which is hereby incorporated by reference herein.

Low Refractive Index Fluorinated (Co)polymer Layers

Turning to the drawings, FIG. 1 is a diagram of an exemplary multilayer optical film 10. Film 10 includes layers arranged in the following order: a substrate 12; and preferably an optical performance and/or adhesion-promoting layer 14; and at least one fluorinated (co)polymer layer 16, optionally with one or more dyads or optical pairs comprised of an additional optical performance and/or adhesion-promoting layer(s) 18 and an additional fluorinated (co)polymer layer(s) 20.

Optional optical performance and/or adhesion-promoting layer 14 and fluorinated (co)polymer layer 16 together form a dyad or optical pair, and optional optical performance and/or adhesion-promoting layer 18 and optional fluorinated (co)polymer layer 20 together form a second dyad or optical pair. Although two dyads or optical pairs are shown, film 10 can include additional dyads or optical pairs of alternating optical performance and/or adhesion-promoting layers 18 and fluorinated (co)polymer layers 20 overlaying the substrate 12 between substrate 12 and the uppermost dyad or an optional optical performance fluorinated (co)polymer layer 20.

Substrates

Substrate 12 can be a flexible, visible light-transmissive substrate, such as a flexible light transmissive polymeric film. In one presently preferred exemplary embodiment, the substrates are substantially transparent, and can have a visible light transmission of at least about 50%, 60%, 70%, 80%, 90% or even up to about 100% at 550 nm.

Exemplary flexible light-transmissive substrates include thermoplastic polymeric films including, for example, polyesters, poly(meth)acrylates (e.g., polymethyl meth(meth)acrylate), polycarbonates, polypropylenes, high or low density polyethylenes, polysulfones, polyether sulfones, polyurethanes, polyamides, polyvinyl butyral, polyvinyl chloride, fluoropolymers (e.g., polyvinylidene difluoride, ethylenetetrafluoroethylene (ETFE) (co)polymers, terafluoroethylene (co)polymers, hexafluoropropylene (co)polymers, polytetrafluoroethylene, and copolymers thereof), polyethylene sulfide, cyclic olefin (co)polymers, and thermoset films such as epoxies, cellulose derivatives, polyimide, polyimide benzoxazole and polybenzoxazole.

Presently preferred polymeric films comprise polyethylene terephthalate (PET), polyethylene napthalate (PEN), heat stabilized PET, heat stabilized PEN, cyclic olefin (co) polymer (COP or COC), polyoxymethylene, polyvinylnaphthalene, polyetheretherketone, fluoropolymer, polycarbonate, polymethylmeth(meth)acrylate, poly α-methyl styrene, polysulfone, polyphenylene oxide, polyetherimide, polyethersulfone, polyamideimide, polyimide, polyphthalamide, or combinations thereof.

In some exemplary embodiments, the substrate can also be a multilayer optical film ("MOF"), such as those described in U.S. Patent Application Publication No. US 2004/0032658 A1. In one exemplary embodiment, the films can be prepared on a substrate including PET.

The substrate may have a variety of thicknesses, e.g., about 0.01 to about 1 mm. The substrate may however be considerably thicker, for example, when a self-supporting article is desired. Such articles can conveniently also be made by laminating or otherwise joining a disclosed film made using a flexible substrate to a thicker, inflexible or less flexible supplemental support.

The (co)polymeric film can be heat-stabilized, using heat setting, annealing under tension, or other techniques that will discourage shrinkage up to at least the heat stabilization temperature when the polymeric film is not constrained.

(Co)polymer Layer(s)

The multilayer optical film includes at least one (co)polymer layer obtained by polymerizing (e.g., free radical polymerization) at least one of the foregoing polymerizable compositions including at least one free-radically polymerizable monomer, oligomer, or mixture thereof and at least one of the foregoing fluorinated photoinitiators, optionally including at least one of the foregoing fluorinated coupling agents.

Fluorinated (Co)polymer Layer(s)
Free-Radically Polymerizable Oligomers

Returning to FIG. 1, in one aspect, for example, the at least one fluorinated (co)polymer layer 16 can be formed from various precursors, for example, fluorinated and/or non-fluorinated (meth)acrylate monomers and/or oligomers that include isobornyl (meth)acrylate, dipentaerythritol penta(meth)acrylates, epoxy (meth)acrylates, epoxy (meth)acrylates blended with styrene, di-trimethylolpropane tetra (meth)acrylates, diethylene glycol di(meth)acrylates, 1,3-butylene glycol di(meth)acrylate, penta(meth)acrylate esters, pentaerythritol tetra(meth)acrylates, pentaerythritol tri(meth)acrylates, ethoxylated (3) trimethylolpropane tri (meth)acrylates, ethoxylated (3) trimethylolpropane tri (meth)acrylates, alkoxylated trifunctional (meth)acrylate esters, dipropylene glycol di(meth)acrylates, neopentyl glycol di(meth)acrylates, ethoxylated (4) bisphenol A dimeth (meth)acrylates, tricyclodecanedimethanol di(meth)acrylates, cyclohexane dimethanol di(meth)acrylate esters, isobornyl meth(meth)acrylate, cyclic di(meth)acrylates and tris (2-hydroxy ethyl) isocyanurate tri(meth)acrylate, and urethane (meth)acrylates. Such compounds are widely available from vendors such as, for example, Sartomer Company, Exton, Pa.; UCB Chemicals Corporation, Smyrna, Ga.; and Aldrich Chemical Company, Milwaukee, Wisconsin, or can be prepared by standard methods. Additional useful (meth)acrylate materials include dihydroxyhydantoin moiety-containing poly(meth)acrylates, for example, as described in U.S. Pat. No. 4,262,072 (Wendling et al.).

Preferably, the at least one fluorinated (co)polymer layer precursor comprises a fluorinated or non-fluorinated (meth)acrylate monomer.

Fluorinated Monomers

In some embodiments, the (meth)acrylate monomers and/or oligomers include highly fluorinated monomers. Perfluorooxyalkyl and perfluoroxyalkylene compounds can be obtained by oligomerization of hexafluoropropylene oxide that result in terminal carbonyl fluoride group(s). This carbonyl fluoride(s) may be converted to an ester by reactions known to those skilled in the art. Preparation of perfluorinated methyl ester compounds are described, for example, in U.S. Pat. Nos. 3,250,808 and 9,718,896. Preparation of perfluorooxyalkyl and perfluoroxyalkylene compounds comprising (meth)acryl groups is also known. See for example, U.S. Pat. No. 9,718,896. Examples include di(meth)acrylates including hexafluoropropylene oxide oligomer (HFPO) moieties. In certain such exemplary embodiments, the free-radically polymerizable monomer, oligomer, or combination thereof has a fluorine content of at least 25, 30 or 35 wt. %. In some of the foregoing embodiments, the polymerizable composition comprises at least of a (meth)acrylic monomer or oligomer, optionally wherein the at least one (meth)acrylic monomer or oligomer comprises the HFPO oligomer diacrylate described below of the structure:

$CH_2=CHC(O)O-H_2C-(CF_3)CF-[OCF_2(CF_3)CF]_s-O(CF_2)_uO-[CF(CF_3)CF_2O]_t-CF(CF_3)-CH_2-OC(O)CH=CH_2$, having, for example, a number average molecular weight of about 2000 g/mole, prepared according to the synthetic method generally described in U.S. Pat. No. 9,718,961 (PFE-3). Here HFPO refers to the perfluorooxyalkylene group "—HFPO—" which is $-(CF_3)CF-[OCF_2(CF_3)CF]_s-O(CF_2)_uO-[CF(CF_3)CF_2O]_t-CF(CF_3)-$, wherein u is from 2 to 6 and s and t are independently integers of 2 to 25. In some embodiments p is 3 or 4. In some embodiments, the sum of s and t is at least 3, 4, 5, 6, 7, 8, 9, or 10. In some embodiments, the sum of s and t is no greater than 24, 23, 22, 21, 20, 19, 18, 17, 16, 15, 14, 13, 12, 11, or 10. Divalent —HFPO— generally also exists as a distribution or mixture of molecules with a range of values for s and t. Thus, s and t may be expressed as an average value. Such average value is typically not an integer.

Aminosilane Monomers

Especially useful in the practice of the presently described embodiments, as materials for Michael addition to poly(meth)acrylates, are the secondary amino silanes that include N-methyl aminopropyltrimethoxy silane, N-methyl aminopropyltriethoxy silane, Bis(propyl-3-trimethoxysilane) amine, Bis(propyl-3-triethoxysilane) amine, N-butyl aminopropyltrimethoxy silane, N-butyl minopropyltriethoxy silane, N-cyclohexyl aminopropyltrimethoxy silane, N-cyclohexyl aminopropyltriethoxy silane, N-cyclohexyl aminomethyltrimethoxy silane, N-cyclohexyl aminomethyltriethoxy silane, N-cyclohexyl aminomethyldiethoxy monomethyl silane.

Other aminosilanes useful in the practice of this disclosure are described in U.S. Pat. No. 4,378,250 (Treadway et al.) and include aminoethyltriethoxysilane, β-aminoethyltrimethoxysilane, β-aminoethyltriethoxysilane, β-aminoethyltributoxysilane, β-aminoethyltripropoxysilane, α-aminoethyltrimethoxysilane, α-aminoethyltriethoxy-silane, γ-aminopropyltrimethoxysilane, γ-aminopropyltrimethoxysilane, γ-aminopropyl-triethoxysilane, γ-aminopropyltributoxysilane, γ-aminopropyltripropoxysilane, β-aminopropyltrimethoxysilane, β-aminopropyltriethoxysilane, β-aminopropyl-tripropoxysilane, β-aminopropyltributoxysilane, α-aminopropyltrimethoxysilane, α-amino-propyltriethoxysilane, α-aminopropyltributoxysilane, and α-aminopropyl-tripropoxysilane.

Minor amounts (<20 mole percent) of catenary nitrogen-containing aminosilanes may also be used, including those described in U.S. Pat. No. 4,378,250 (Treadway et al. N-(β-aminoethyl)-β-aminoethyltrimethoxysilane, N-(β-aminoethyl)-β-aminoethyltriethoxysilane, N-(β-aminoethyl)-β-aminoethyltripropoxysilane, N-(β-aminoethyl)-α-aminoethyltrimethoxysilane, N-(β-aminoethyl)-α-aminoethyl-triethoxysilane, N-(β-aminoethyl)-α-aminoethyltripropoxysilane, N-(β-aminoethyl)-β-aminopropyltrimethoxysilane, N-(β-aminoethyl)-γ-aminopropyltriethoxysilane, N-(β-aminoethyl)-γ-aminopropyltripropoxysilane, N-(β-aminoethyl)-γ-aminopropyl-trimethoxysilane, N-(β-aminoethyl)-β-aminopropyltriethoxysilane, N-(β-aminoethyl)-β-aminopropyltripropoxysilane, N-(γ-aminopropyl)-β-aminoethyltrimethoxysilane, N-(γ-aminopropyl)-β-aminoethyltriethoxysilane, N-(γ-aminopropyl)-β-aminoethyl-tripropoxysilane, N-methylaminopropyltrimethoxysilane, β-aminopropylmethyl-diethoxysilane, and γ-diethylene triaminepropyltriethoxysilane.

Thiosilane Compounds

Also useful in the practice of the presently described embodiments, as materials for Michael addition to poly (meth)acrylates, are thiosilanes. Examples of silane compounds comprising hydrolysable groups and a mercapto group include for example 3-mercaptopropyltriethoxysilane; 3-mercaptopropyl-trimethoxysilane; 11-mercaptoundecyltrimethoxysilane; s-(octanoyl)mercapto-propyltriethoxysilane; (mercaptomethyl)methyldiethoxysilane; and 3-mercaptopropylmethyldimethoxysilane.

Isocyanate Functional Silanes and (Meth)acrylates

Isocyanato functional acrylates and silanes may be used in the in the practice of the presently described embodiments. Examples of suitable isocyanate functional (meth)acrylate include isocyanatoethyl methacrylate, isocyanatoethoxyethyl methacrylate, isocyanatoethyl acrylate, and 1,1-(bisacryloyloxymethyl) ethyl isocyanate, which are for instance commercially available from Showa Denko (Tokyo, Japan). Examples of suitable isocyanate functional silanes include isocyanatopropyltrimethoxysilane, and isocyanatopropyltriethoxysilane, available as Silquest A-Link35 and Silquest A-Link A-1310, respectively from Momentive (Waterford, N.Y.).

Returning to FIG. 1, in some exemplary embodiments, the at least one (co)polymer layer 16 may additionally include any fluorinated (co)polymer suitable for deposition in a thin film.

The at least one fluorinated (co)polymer layer 16 can be formed by applying a layer of a monomer or oligomer to the substrate and crosslinking the layer to form the (co)polymer in situ, e.g., by flash evaporation and vapor deposition of a radiation-crosslinkable monomer, followed by crosslinking using, for example, an electron beam apparatus, UV light source, electrical discharge apparatus or other suitable device. Coating efficiency can be improved by cooling the substrate.

The monomer or oligomer can also be applied to the substrate 12 using conventional coating methods such as roll coating (e.g., gravure roll coating) or spray coating (e.g., electrostatic spray coating), then crosslinked as set out above. The at least one fluorinated (co)polymer layer 16 can also be formed by applying a layer containing an oligomer or (co)polymer in solvent and drying the thus-applied layer to remove the solvent. Plasma Enhanced Chemical Vapor Deposition (PECVD), Chemical Vapor Deposition (CVD), initiated Chemical Vapor Deposition (iCVD), Plasma Polymerization, and Molecular Layer Deposition (MLD) may also be employed in some cases.

Preferably, the at least one fluorinated (co)polymer layer 16 is formed by flash evaporation and vapor deposition followed by crosslinking in situ, e.g., as described in U.S. Pat. No. 4,696,719 (Bischoff), U.S. Pat. No. 4,722,515 (Ham), U.S. Pat. No. 4,842,893 (Yializis et al.), U.S. Pat. No. 4,954,371 (Yializis), U.S. Pat. No. 5,018,048 (Shaw et al.), U.S. Pat. No. 5,032,461 (Shaw et al.), U.S. Pat. No. 5,097,800 (Shaw et al.), U.S. Pat. No. 5,125,138 (Shaw et al.), U.S. Pat. No. 5,440,446 (Shaw et al.), U.S. Pat. No. 5,547,908 (Furuzawa et al.), U.S. Pat. No. 6,045,864 (Lyons et al.), U.S. Pat. No. 6,231,939 (Shaw et al. and U.S. Pat. No. 6,214,422 (Yializis); in PCT International Publication No. WO 00/26973 (Delta V Technologies, Inc.); in D. G. Shaw and M. G. Langlois, "A New Vapor Deposition Process for Coating Paper and Polymer Webs", 6th International Vacuum Coating Conference (1992); in D. G. Shaw and M. G. Langlois, "A New High Speed Process for Vapor Depositing Acrylate Thin Films: An Update", Society of Vacuum Coaters 36th Annual Technical Conference Proceedings (1993); in D. G. Shaw and M. G. Langlois, "Use of Vapor Deposited Acrylate Coatings to Improve the Barrier Properties of Metallized Film", Society of Vacuum Coaters 37th Annual Technical Conference Proceedings (1994); in D. G. Shaw, M. Roehrig, M. G. Langlois and C. Sheehan, "Use of Evaporated Acrylate Coatings to Smooth the Surface of Polyester and Polypropylene Film Substrates", RadTech (1996); in J. Affinito, P. Martin, M. Gross, C. Coronado and E. Greenwell, "Vacuum Deposited Polymer/Metal Multilayer optical films for Optical Application", Thin Solid Films 270, 43-48 (1995); and in J. D. Affinito, M. E. Gross, C. A. Coronado, G. L. Graff, E. N. Greenwell and P. M. Martin, "Polymer-Oxide Transparent Barrier Layers", Society of Vacuum Coaters 39th Annual Technical Conference Proceedings (1996).

In some exemplary embodiments, the smoothness and continuity of the at least one fluorinated (co)polymer layer 16 (and optionally also each oxide layer) and its adhesion to the underlying substrate or layer may be enhanced by appropriate pretreatment. Examples of a suitable pretreatment regimen include an electrical discharge in the presence of a suitable reactive or non-reactive atmosphere (e.g., plasma, glow discharge, corona discharge, dielectric barrier discharge or atmospheric pressure discharge); chemical pretreatment or flame pretreatment. These pretreatments help make the surface of the underlying layer more receptive to formation of the subsequently applied polymeric (or inorganic) layer. Plasma pretreatment can be particularly useful.

The desired chemical composition and thickness of the at least one fluorinated (co)polymer layer will depend in part on the design target refractive index and optical performance. The thickness range is from a fraction of a quarter-wave optical thickness for multilayer thin film optical coatings to 10 microns thick or thicker in some nano- or micro-structured optical constructions.

In some exemplary embodiments, a separate optical performance and/or adhesion-promoting layer 18, which may have a different composition than the at least one fluorinated (co)polymer layer 16, the optical performance and/or adhesion-promoting layer 14, and/or the optional additional fluorinated (co)polymer layer 20, may also be used atop the substrate or an underlying layer to improve adhesion. The optical and/or adhesion-promoting layer 18 can be, for example, a separate polymeric layer or a metal-containing layer such as a layer of metal, metal oxide, metal nitride or metal oxynitride. The optical and/or adhesion-promoting layer 18 may have a thickness of a few nm (e.g., 1 or 2 nm) to about 50 nm, and can be thicker if desired.

The desired chemical composition and thickness of the at least one fluorinated (co)polymer layer will depend in part on the nature and surface topography of the substrate. The thickness preferably is sufficient to provide a smooth, defect-free surface to which the subsequent adhesion-promoting layer can be applied. For example, the at least one fluorinated (co)polymer layer may have a thickness of a few nm (e.g., 2 or 3 nm) to about 5 micrometers, and can be thicker if desired.

As described elsewhere, the multilayer optical film can include an adhesion-promoting layer deposited directly on a substrate that includes a moisture sensitive device, a process often referred to as direct encapsulation. The moisture sensitive device can be, for example, an organic, inorganic, or hybrid organic/inorganic semiconductor device including, for example, a photovoltaic device such as a copper indium gallium di-selenide (CIGS) photovoltaic device; a display device such as an organic light emitting diode (OLED), electrochromic, or an electrophoretic display; an OLED or other electroluminescent solid state lighting device, or others. Flexible electronic devices can be encapsulated directly with the gradient composition adhesion-promoting layer as described below. For example, the devices can be attached to a flexible carrier substrate, and a mask can be deposited to protect electrical connections from the adhesion-promoting layer deposition. The at least one fluorinated (co)polymer layer 16, the optical and/or adhesion-promoting layers 14 and 18 and the fluorinated (co)polymer layer 20 can be deposited as described further below, and the mask can then be removed, exposing the electrical connections.

High Refractive Index Layers

As described elsewhere, the multilayer optical film can include a high refractive index layer that may be deposited overlaying a substrate, or overlaying a low refractive index fluorinated (co)polymer layer. The at least one low refractive index fluorinated (co)polymer layer 16, and the high refractive index layer 14 can be deposited as described further below.

Thus, preferably, the multilayer optical film includes at least one high refractive index layer 14. The high refractive index layer can comprise inorganic, organic, or hybrid inorganic/organic material. The high refractive index layer preferably comprises at least one inorganic material. Suitable inorganic materials include oxides, nitrides, carbides or borides of different atomic elements, metals and metal alloys. Presently preferred inorganic materials included in the high refractive index layer comprise oxides, nitrides, carbides or borides of atomic elements from Groups IIA, IIIA, IVA, VA, VIA, VIIA, IB, or IIB, metals of Groups IIIB, IVB, or VB, rare-earth metals, or combinations thereof. In some exemplary embodiments, high refractive index oxide layers comprising titanium, zirconium, hafnium, vanadium, niobium, tantalum, cerium or a combination thereof are preferred.

Oxide Layers

As described elsewhere, the multilayer optical film can include an oxide layer that may be deposited overlaying a substrate that includes a moisture sensitive device, a process often referred to as direct encapsulation.

In some particular exemplary embodiments, an inorganic layer, more preferably an inorganic oxide layer, may be applied to the uppermost fluorinated (co)polymer layer. Preferably, the oxide layer comprises titanium oxide, niobium oxide, or silicon aluminum oxide.

In some exemplary embodiments, the composition of the oxide layer may change in the thickness direction of the layer, i.e. a gradient composition. In such exemplary embodiments, the oxide layer preferably includes at least two inorganic materials, and the ratio of the two inorganic materials changes throughout the thickness of the oxide layer. The ratio of two inorganic materials refers to the relative proportions of each of the inorganic materials. The ratio can be, for example, a mass ratio, a volume ratio, a concentration ratio, a molar ratio, a surface area ratio, or an atomic ratio.

The resulting gradient oxide layer is an improvement over homogeneous, single component layers. Additional benefits in optical properties can also be realized when combined with thin, vacuum deposited fluorinated (co)polymer layers. A multilayer gradient inorganic-(co)polymer barrier stack can be made to enhance optical properties. The multilayer optical film can be fabricated by deposition of the various layers onto the substrate, in a roll-to-roll vacuum chamber similar to the system described in U.S. Pat. No. 5,440,446 (Shaw et al.) and U.S. Pat. No. 7,018,713 (Padiyath, et al.). The deposition of the layers can be in-line, and in a single pass through the system. In some cases, the multilayer optical film can pass through the system several times, to form a multilayer optical film having several optical pairs.

High refractive index layers also can comprise organic materials. Suitable organic materials include (co)polymers, particle-filled (co)polymers, small molecule organic solid materials. Preferred particle-filled (co)polymers comprise silica, zirconia and/or titania nanoparticles in acrylate (co)polymers, as described in U.S. Pat. No. 7,547,476.

High refractive index layers can comprise inorganic/organic hybrid materials. Preferred inorganic/organic hybrid materials include organotitanate polymers such as polybutyltitanate.

For purposes of clarity, the high refractive index layer 14 described in the following discussion is directed toward a composition of oxides; however, it is to be understood that the composition can include any of the oxides, nitrides, carbides, borides, oxynitrides, oxyborides, metals, metal alloys, organic, or inorganic/organic hybrid materials and the like described above.

In one embodiment of the oxide layer 14, the first inorganic material is silicon oxide, and the second inorganic material is aluminum oxide. In this embodiment, the atomic ratio of silicon to aluminum changes throughout the thickness of the oxide layer, e.g., there is more silicon than aluminum near a first surface of the oxide layer, gradually becoming more aluminum than silicon as the distance from the first surface increases. In one embodiment, the atomic ratio of silicon to aluminum can change monotonically as the distance from the first surface increases, i.e., the ratio either increases or decreases as the distance from the first surface increases, but the ratio does not both increase and decrease as the distance from the first surface increases. In another embodiment, the ratio does not increase or decrease monotonically, i.e. the ratio can increase in a first portion, and decrease in a second portion, as the distance from the first surface increases. In this embodiment, there can be several increases and decreases in the ratio as the distance from the first surface increases, and the ratio is non-monotonic. A change in the inorganic oxide concentration from one oxide species to another throughout the thickness of the oxide layer 14 results in improved optical performance.

The gradient composition can be made to exhibit other unique optical properties. The gradient change in composition of the layer produces corresponding change in refractive index through the layer. The materials can be chosen such that the refractive index can change from high to low, or vice versa. For example, going from a high refractive index to a low refractive index can allow light traveling in one direction to easily pass through the layer, while light travelling in the opposite direction may be reflected by the layer. The refractive index change can be used to design layers to enhance light extraction from a light emitting device being protected by the layer. The refractive index change can instead be used to pass light through the layer and into a light harvesting device such as a solar cell. Other optical constructions, such as band pass filters, can also be incorporated into the multilayer optical film.

In order to promote silane bonding to the oxide surface, it may be desirable to form hydroxyl silanol (Si—OH) groups on a freshly sputter deposited silicon dioxide ($SiO_2$) layer. The amount of water vapor present in a multi-process vacuum chamber can be controlled sufficiently to promote the formation of Si—OH groups in high enough surface concentration to provide increased bonding sites. With residual gas monitoring and the use of water vapor sources the amount of water vapor in a vacuum chamber can be controlled to ensure adequate generation of Si—OH groups.

Formation of (Co)polymer Layers

The (meth)acrylate vapor deposition process is limited to chemistries that are pumpable (liquid-phase with an acceptable viscosity); that can be atomized (form small droplets of liquid), flash evaporated (high enough vapor pressure under vacuum conditions), condensable (vapor pressure, molecular weight), and can be cross-linked in vacuum (molecular weight range, reactivity, functionality).

Vapor Coating Compositions

The vapor coating compositions may be prepared via mixing. The fluorinated photoinitiators and optional coupling agents of this disclosure are generally soluble in fluorinated monomers and/or fluorinated solvents, forming clear solutions.

Processes for Making Layers and Multilayer Optical Films

In another aspect, the disclosure describes a process for making a layer or a multilayer optical film.

In one exemplary presently preferred embodiment, the disclosure describes a process for making a multilayer optical film, the process including:

step (a) comprises depositing an oxide onto the substrate to form the optical performance and/or adhesion-promoting layer, wherein depositing is achieved using sputter deposition, reactive sputtering, plasma enhanced chemical vapor deposition, or a combination thereof.

In other exemplary embodiments, step (b) comprises:

(i) evaporating a at least one fluorinated (co)polymer layer precursor;

(ii) condensing the evaporated at least one fluorinated (co)polymer layer precursor onto the at least one adhesion-promoting or high refractive index layer; and (iii) curing the evaporated at least one fluorinated (co)polymer layer precursor to form the at least one fluorinated (co)polymer layer.

In further exemplary embodiments, the process further comprises sequentially repeating steps (a) and (b) to form a plurality of alternating layers (i.e. dyads or optical pairs) of the optical performance and/or adhesion-promoting layer and the fluorinated (co)polymer layer on the at least one optical performance and/or adhesion-promoting layer.

Figure 2:
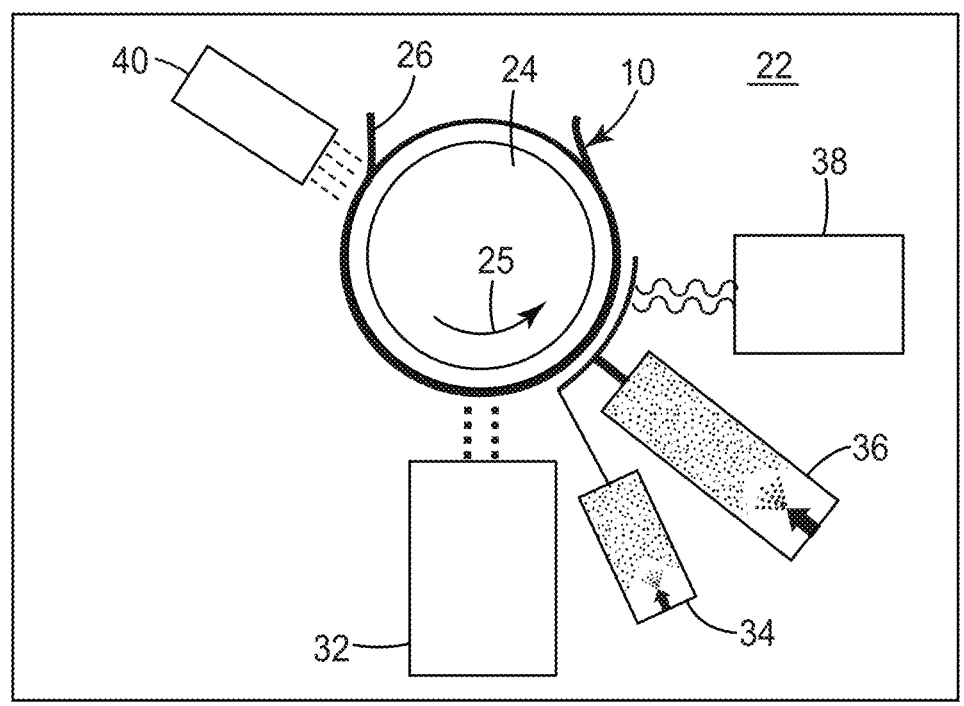
FIG. 2 is a diagram illustrating an exemplary process for making a multilayer optical film including at least one layer formed using a fluorinated photoinitiator according to an exemplary embodiment of the present disclosure.
Figure 3:
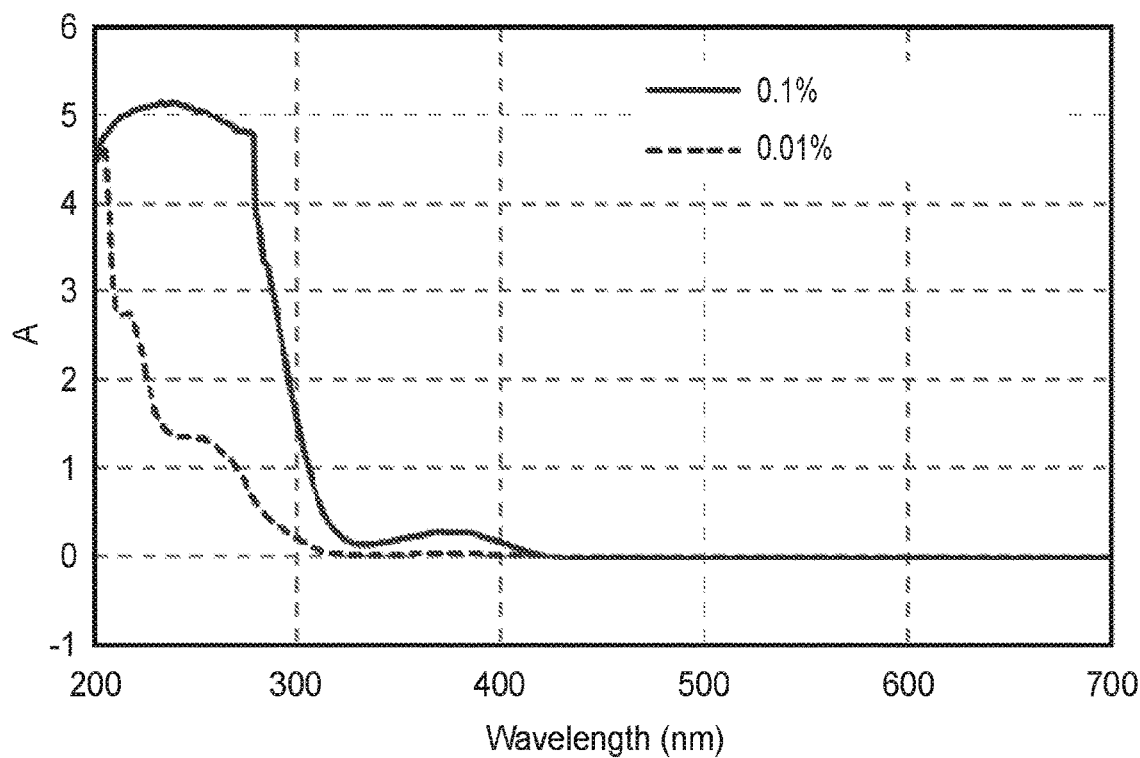
FIG. 3 is a UV-VIS spectrum of an exemplary fluorinated photoinitiator according to an exemplary embodiment of the present disclosure.
Figure 4:
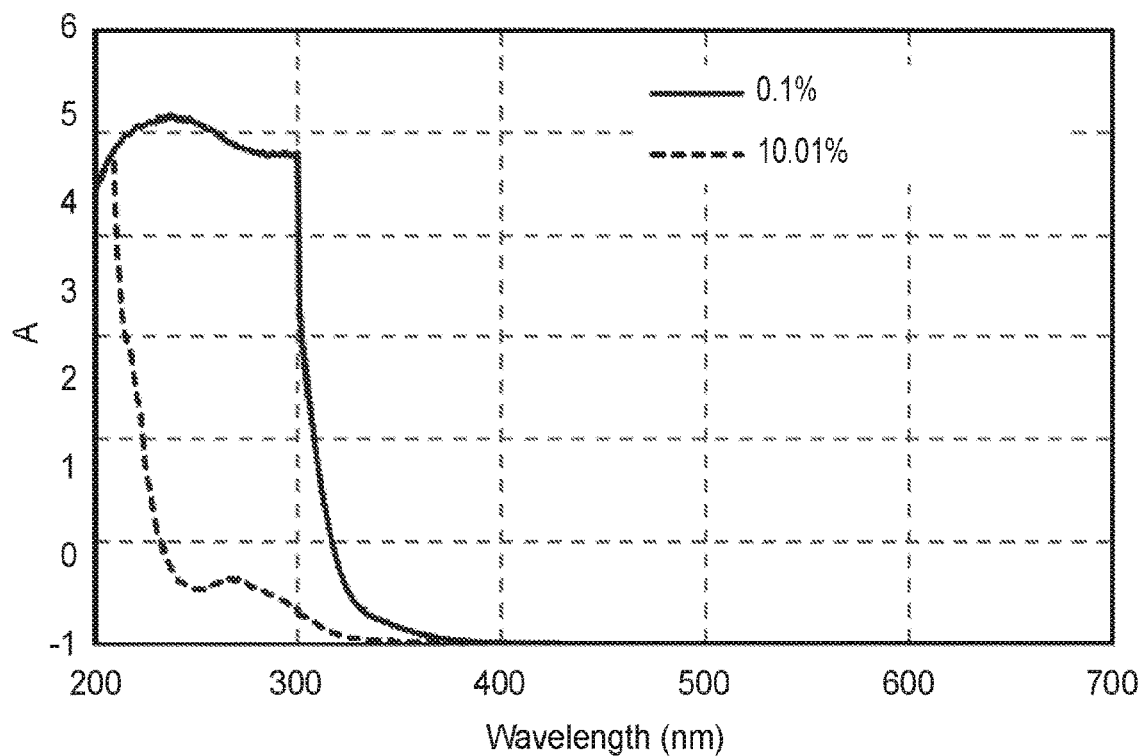
FIG. 4 is a UV-VIS spectrum of an another exemplary fluorinated photoinitiator according to another exemplary embodiment of the present disclosure.
Figure 5:
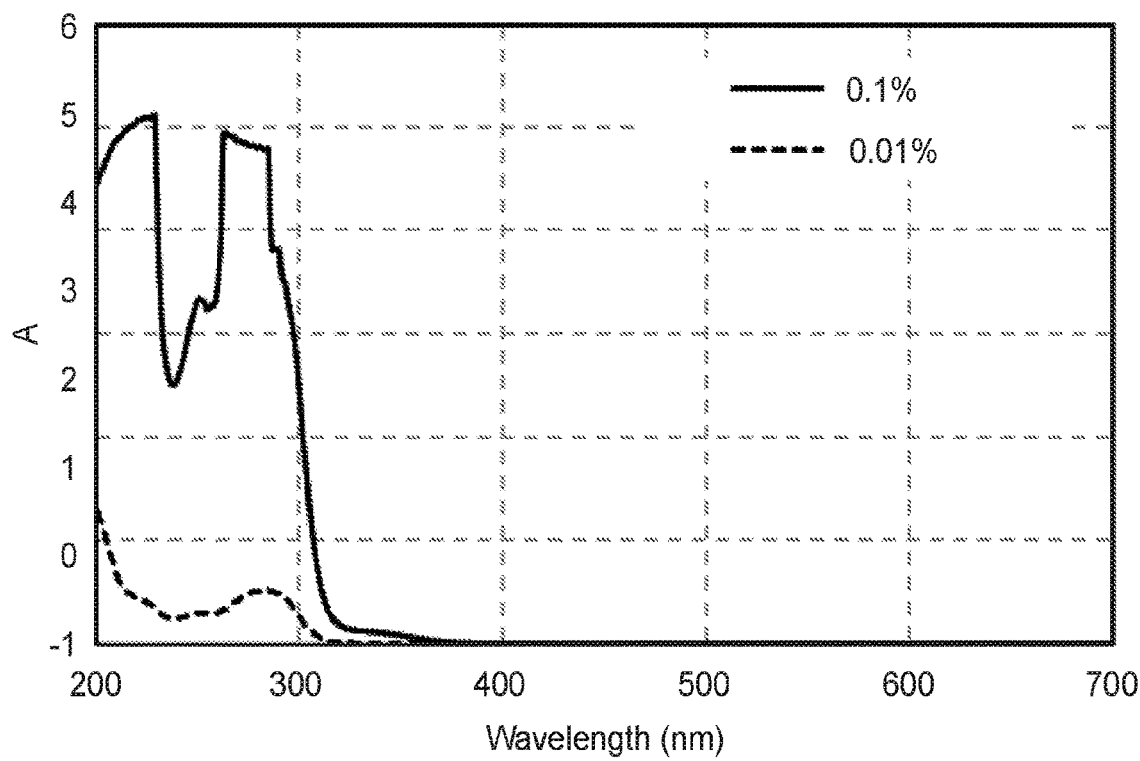
FIG. 5 is a UV-VIS spectrum of yet another exemplary fluorinated photoinitiator according to yet another exemplary embodiment of the present disclosure.
Figure 6:
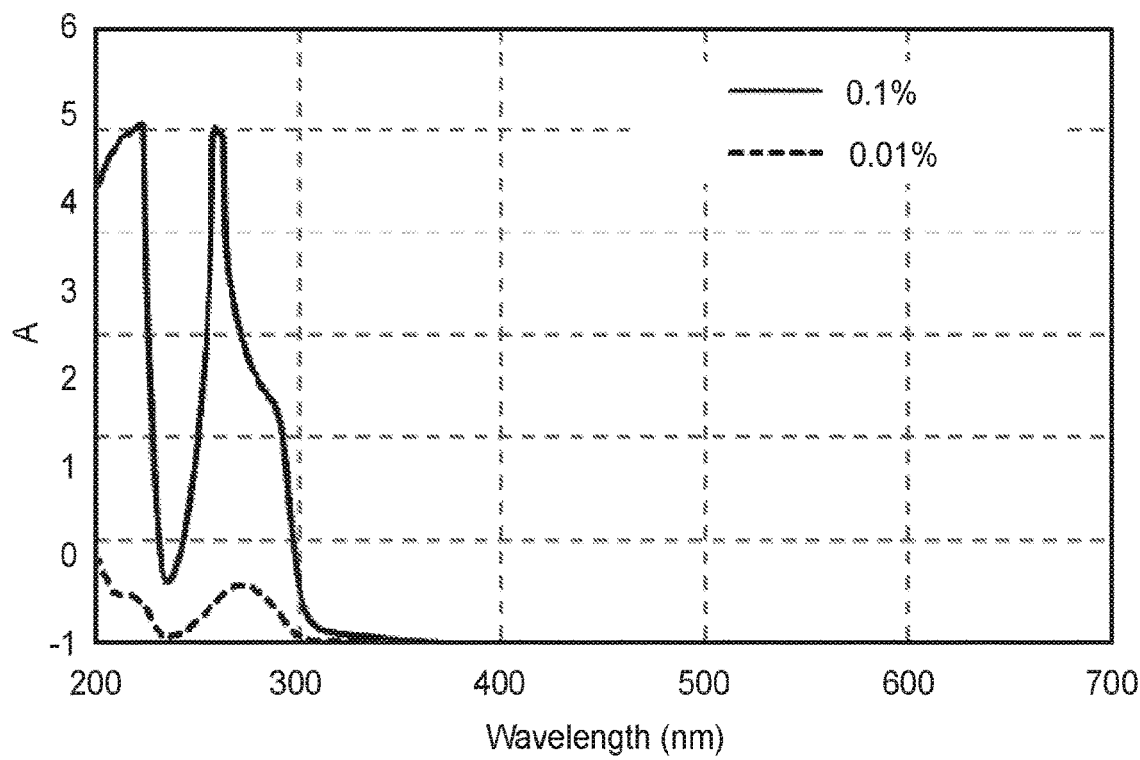
FIG. 6 is a UV-VIS spectrum of still another exemplary fluorinated photoinitiator according to still another exemplary embodiment of the present disclosure.

FIG. 2 is a diagram of a system 22, illustrating a process for making multilayer optical film 10. System 22 is contained within an inert environment and includes a chilled drum or roller 24 for receiving and moving the substrate 12 (FIG. 1), as represented by a substrate film 26, thereby providing a moving web on which to form optical layers. Preferably, an optional nitrogen plasma treatment unit 40 may be used to plasma treat or prime substrate film 26 in order to improve adhesion of the at least one fluorinated (co)polymer layer 16 (FIG. 1) to substrate 12 (FIG. 1) or the at least one adhesion-promoting or optical performance layer 14 (FIG. 1) to substrate 12 (FIG. 1).

An oxide sputter unit 32 applies an oxide to form layer 14 (FIG. 1) as drum 24 advances film 26. An evaporator 36 applies an at least one fluorinated (co)polymer layer precursor preferably from a polymerizable composition comprising a mixture of at least one of the foregoing fluorinated photoinitiators and at least one free-radically polymerizable monomer, oligomer, or mixture thereof, and optionally at least one of the foregoing fluorinated coupling agents, which is cured by curing unit 38 to form at least one fluorinated (co)polymer layer 16 (FIG. 1) as drum 24 advances the film 26 in a direction shown by arrow 25.

For additional optional dyads or optical pairs comprised of alternating optical performance and/or adhesion-promoting layer 18 and alternating fluorinated (co)polymer layers 20, drum 24 can rotate in a reverse direction opposite arrow 25 and then advance film 26 again to apply the additional alternating adhesion-promoting and/or optical performance layer and at least one fluorinated (co)polymer layer, and that sub-process can be repeated for as many alternating layers as desired or needed. Alternatively, the layers may be applied sequentially in a roll-to-roll process using a substrate in the form of a substantially continuous web.

Optionally, once the at least one optical performance and/or adhesion-promoting (e.g. oxide) layers (14 and optionally 18) and fluorinated (co)polymer layers (16 and optionally 20) have been applied to the substrate film 12, drum or roller 24 further advances the film, and evaporator 36 may deposit an additional optical layer overlaying the optical stack. Co-depositing the fluorinated photoinitiator and optionally the fluorinated coupling agent and the fluorinated monomer, oligomer, or mixture can involve sequentially evaporating the fluorinated coupling agent and the fluorinated monomer, oligomer, or mixture from separate sources, or co-evaporating a mixture of the fluorinated coupling agent and the fluorinated monomer, oligomer, or mixture.

An optional additional evaporator 34 also may be used to provide other co-reactants or co-monomers (e.g. additional (meth)acryloyl compounds) which may be useful in forming a fluorinated (co)polymer layer (e.g., 16 or 20, FIG. 1). In some embodiments, a fluorinated or non-fluorinated photoinitiator and optionally a fluorinated or non-fluorinated coupling agent can be evaporated in additional evaporator 34 while evaporating the fluorinated free-radically polymerizable monomer, oligomer, or mixture and optionally the fluorinated photoinitiator in evaporator 36. In this way, the photoinitiator and the fluorinated (co)polymer materials are sequentially evaporated from separate liquid sources and deposited. Preferably, the sequential combination of the fluorinated photoinitiator and the fluorinated free-radically polymerizable monomer, oligomer, or mixture comprises fluorinated photoinitiator in an amount no more than about 50.0, 40.0, 30.0, 20.0, 15.0, 10.0, 7.5, 5.0, 4.0 or 3.0 wt. % based on the weight of the polymerizable composition.

For additional dyads or optical pairs comprised of alternating fluorinated (co)polymer layers 20 and optical performance and/or adhesion-promoting layers 18, drum 24 can rotate in a reverse direction opposite arrow 25 and then advance substrate film 26 again to apply the additional layers, and that sub-process can be repeated for as many alternating optical pairs or dyads as desired or needed.

In certain presently preferred embodiments, reacting the polymerizable composition to form a fluorinated (co)polymer layer (16 or 20, FIG. 1) occurs at least in part on the substrate film 12. The optical performance and/or adhesion-promoting layer 14 or 18 can be formed using techniques employed in the film metalizing art such as sputtering (e.g., cathode or planar magnetron sputtering), evaporation (e.g., resistive or electron beam evaporation), chemical vapor deposition, plating and the like.

In one aspect, the optical performance and/or adhesion-promoting layer 14 or 18 is formed using sputtering, e.g., reactive sputtering. Enhanced moisture and/or oxygen barrier properties may be obtained when the adhesion-promoting barrier layer is formed by a high energy deposition technique such as sputtering compared to lower energy techniques such as conventional chemical vapor deposition processes. Without being bound by theory, it is believed that the enhanced properties are due to the condensing species arriving at the substrate with greater kinetic energy as occurs in sputtering, leading to a lower void fraction as a result of compaction.

In some exemplary embodiments, the sputter deposition process can use dual targets powered by an alternating current (AC) power supply in the presence of a gaseous atmosphere having inert and reactive gasses, for example argon and oxygen, respectively. The AC power supply alternates the polarity to each of the dual targets such that for half of the AC cycle one target is the cathode and the other target is the anode. On the next cycle the polarity switches between the dual targets. This switching occurs at a set frequency, for example about 40 kHz, although other frequencies can be used. Oxygen that is introduced into the process forms adhesion-promoting layers on both the substrate receiving the inorganic composition, and also on the surface of the target. The dielectric oxides can become charged during sputtering, thereby disrupting the sputter deposition process. Polarity switching can neutralize the surface material being sputtered from the targets, and can provide uniformity and better control of the deposited material.

In further exemplary embodiments, each of the targets used for dual AC sputtering can include a single metal or nonmetal element, or a mixture of metal and/or nonmetal elements. A first portion of the adhesion-promoting layer closest to the moving substrate is deposited using the first set of sputtering targets. The substrate then moves proximate the second set of sputtering targets and a second portion of the adhesion-promoting layer is deposited on top of the first portion using the second set of sputtering targets. The composition of the adhesion-promoting layer changes in the thickness direction through the layer.

In additional exemplary embodiments, the sputter deposition process can use targets powered by direct current (DC) power supplies in the presence of a gaseous atmosphere having inert and reactive gasses, for example argon and oxygen, respectively. The DC power supplies supply power (e.g. pulsed power) to each cathode target independent of the other power supplies. In this aspect, each individual cathode target and the corresponding material can be sputtered at differing levels of power, providing additional control of composition through the layer thickness. The pulsing aspect of the DC power supplies is similar to the frequency aspect in AC sputtering, allowing control of high rate sputtering in the presence of reactive gas species such as oxygen. Pulsing DC power supplies allow control of polarity switching, can neutralize the surface material being sputtered from the targets, and can provide uniformity and better control of the deposited material.

In one particular exemplary embodiment, improved control during sputtering can be achieved by using a mixture, or atomic composition, of elements in each target, for example a target may include a mixture of aluminum and silicon. In another embodiment, the relative proportions of the elements in each of the targets can be different, to readily provide for a varying atomic ratio throughout the adhesion-promoting layer. In one embodiment, for example, a first set of dual AC sputtering targets may include a 90/10 mixture of silicon and aluminum, and a second set of dual AC sputtering targets may include a 75/25 mixture of aluminum and silicon. In this embodiment, a first portion of the adhesion-promoting layer can be deposited with the 90% Si/10% Al target, and a second portion can be deposited with the 75% Al/25% Si target. The resulting adhesion-promoting layer has a gradient composition that changes from about 90% Si to about 25% Si (and conversely from about 10% Al to about 75% Al) through the thickness of the adhesion-promoting layer.

In typical dual AC sputtering, homogeneous adhesion-promoting layers are formed, and barrier performance from these homogeneous adhesion-promoting layers suffer due to defects in the layer at the micro and nano-scale. One cause of these small scale defects is inherently due to the way the oxide grows into grain boundary structures, which then propagate through the thickness of the film. Without being bound by theory, it is believed several effects contribute to the improved barrier properties of the gradient composition barriers described herein. One effect can be that greater densification of the mixed oxides occurs in the gradient region, and any paths that water vapor could take through the oxide are blocked by this densification. Another effect can be that by varying the composition of the oxide materials, grain boundary formation can be disrupted resulting in a microstructure of the film that also varies through the thickness of the adhesion-promoting layer. Another effect can be that the concentration of one oxide gradually decreases as the other oxide concentration increases through the thickness, reducing the probability of forming small-scale defect sites. The reduction of defect sites can result in a coating having reduced transmission rates of water permeation.

The films can be subjected to post-treatments such as heat treatment, ultraviolet (UV) or vacuum UV (VUV) treatment, or plasma treatment. Heat treatment can be conducted by passing the film through an oven or directly heating the film in the coating apparatus, e.g., using infrared heaters or heating directly on a drum. Heat treatment may for example be performed at temperatures from about 30° C. to about 200° C., about 35° C. to about 150° C., or about 40° C. to about 70° C.

Other functional layers or coatings that can be added to the inorganic or hybrid film include an optional layer or layers to make the film more rigid. The uppermost layer of the film is optionally a suitable protective layer, such as optional inorganic layer 18. If desired, the protective layer can be applied using conventional coating methods such as roll coating (e.g., gravure roll coating) or spray coating (e.g., electrostatic spray coating), then crosslinked using, for example, UV radiation. The protective layer can also be formed by flash evaporation, vapor deposition and cross-linking of a monomer as described above. Volatilizable (meth)acrylate monomers are suitable for use in such a protective layer. In a specific embodiment, volatilizable (meth)acrylate monomers are employed.

Articles Incorporating Multilayer Optical Films

In a further aspect, the disclosure describes methods of using a multilayer optical film made as described above in an article, wherein the article is selected from a photovoltaic device, a display device, a solid-state lighting device, a sensor, a medical or biological diagnostic device, or a combination thereof.

Presently preferred articles incorporating such multilayer optical films include flexible thin film (e.g. copper indium gallium diselenide, CIGS) and organic photovoltaic solar cells, and organic light emitting diodes (OLED) used in displays and solid state lighting. Currently these applications are generally limited to non-flexible glass substrates used as vapor barriers.

Exemplary embodiments of the disclosed methods can enable the formation of multilayer optical films that exhibit superior mechanical properties such as elasticity and flexibility and which optionally may have low oxygen or water vapor transmission rates. Multilayer optical films according to the present disclosure may have an oxygen transmission rate (OTR) less than about 1 cc/m$^2$-day, less than about 0.5 cc/m²-day, or less than about 0.1 cc/m²-day. Substrates having a multilayer optical film formed using the disclosed method can have an water vapor transmission rate (WVTR) less than about 10 cc/m²-day, less than about 5 cc/m²-day, or less than about 1 cc/m²-day.

Exemplary multilayer optical films are comprised of at least one fluorinated (co)polymer optical layer and at least one optical and/or adhesion-promoting layer, as described above. In some exemplary embodiments, the disclosed films can have a plurality of dyads or optical pairs of (co)polymer optical layer and at least one optical and/or adhesion-promoting layers.

Exemplary embodiments of multilayer optical films according to the present disclosure are preferably transmissive to both visible and infrared light. The term "transmissive to visible and infrared light" as used herein can mean having an average transmission over the visible and infrared portion of the spectrum of at least about 75% (in some embodiments at least about 80, 85, 90, 92, 95, 97, or 98%) measured along the normal axis. In some embodiments, the visible and infrared light-transmissive assembly has an average transmission over a range of 400 nm to 1400 nm of at least about 75% (in some embodiments at least about 80, 85, 90, 92, 95, 97, or 98%). Visible and infrared light-transmissive assemblies are those that do not interfere with absorption of visible and infrared light, for example, by photovoltaic cells.

In some exemplary embodiments, the visible and infrared light-transmissive assembly has an average transmission over a range wavelengths of light that are useful to a photovoltaic cell of at least about 75% (in some embodiments at least about 80, 85, 90, 92, 95, 97, or 98%). The first and second polymeric film substrates, pressure sensitive adhesive layer, and multilayer optical film can be selected based on refractive index and thickness to enhance transmission to visible and infrared light. Suitable methods for selecting the refractive index and/or thickness to enhance transmission to visible and/or infrared light are described in copending PCT International Publication Nos. WO 2012/003416 and WO 2012/003417.

Exemplary multilayer optical films according to the present disclosure are typically flexible. The term "flexible" as used herein refers to being capable of being formed into a roll. In some embodiments, the term "flexible" refers to being capable of being bent around a roll core with a radius of curvature of up to 7.6 centimeters (cm) (3 inches), in some embodiments up to 6.4 cm (2.5 inches), 5 cm (2 inches), 3.8 cm (1.5 inch), or 2.5 cm (1 inch). In some embodiments, the flexible assembly can be bent around a radius of curvature of at least 0.635 cm (¼ inch), 1.3 cm (½ inch) or 1.9 cm (¾ inch).

Exemplary multilayer optical films according to the present disclosure generally do not exhibit delamination or curl that can arise from thermal stresses or shrinkage in a multilayer structure. Herein, curl is measured using a curl gauge described in "Measurement of Web Curl" by Ronald P. Swanson presented in the 2006 AWEB conference proceedings (Association of Industrial Metallizers, Coaters and Laminators, Applied Web Handling Conference Proceedings, 2006). According to this method curl can be measured to the resolution of 0.25 m$^{-1}$ curvature.

In some embodiments, multilayer optical films according to the present disclosure exhibit curls of up to 7, 6, 5, 4, or 3 m$^{-1}$. From solid mechanics, the curvature of a beam is known to be proportional to the bending moment applied to it. The magnitude of bending stress is in turn is known to be proportional to the bending moment. From these relations the curl of a sample can be used to compare the residual stress in relative terms. Barrier films also typically exhibit high peel adhesion to EVA, and other common encapsulants for photovoltaics, cured on a substrate. The properties of the multilayer optical films disclosed herein typically are maintained even after high temperature and humidity aging.

The operation of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

All parts, percentages, and ratios in the examples are by weight, unless noted otherwise. Solvents and other reagents used were obtained from Sigma-Aldrich Chemical Company; Milwaukee, WI unless specified differently.

Materials

Table 1 lists the materials used to prepare fluorinated photoinitiators according to the foregoing disclosure:

TABLE 1

Materials Used in the Examples

| Short Name | Long Name | CAS Number | Source |
|---|---|---|---|
| Dimethyl Phenylphosphonite | Dimethoxyphenylphosphine | 2946-64-4 | Alfa Aesar |
| Pentafluorobenzoyl chloride | 2,3,4,5,6-Pentafluorobenzoyl chloride | 2251-50-5 | Oakwood Chemicals |
| Bis-Trifluoromethylbenzoyl Chloride | 3,5-Bis(trifluoromethyl)benzoyl chloride | 785-56-8 | Oakwood Chemicals |
| AEBP | Acrylated ethyoxyethyl benzophenone | 22421-66-5 | Prepared as in U.S. Pat. No. 9,587,127, Examples 5 and 6, columns 11 and 12 |
| BHT | 2,6-di-t-butyl-4-methylphenol | | Alfa Aesar |
| Ethyl acetate | Ethyl acetate | | Sigma-Aldrich |
| HFPO—C(O)NH—CH$_2$CH$_2$CH$_2$—NH(CH$_3$) | | | Prepared by a method similar to that of Preparation 22, as shown in U.S. Pat. No. |

TABLE 1-continued

Materials Used in the Examples

| Short Name | Long Name | CAS Number | Source |
|---|---|---|---|
| IEA | Isocyanatoethyl acrylate | | 7,718,264 column 29, lines 44-57. Showa Denko |
| Irgacure 2959 | 2-hydroxy-4'-(2-hydroxyethoxy)-2-methylpropiophenone | 106797-53-9 | TCI America |
| MEK | Methyl ethyl ketone | | Sigma-Aldrich |
| 3-(methyl)-1,3-propane diamine | 3-(methyl)-1,3-propane diamine | 6291-84-5 | Sigma-Aldrich |
| Novec 7200 | $C_4F_9OCH_2CH_3$ | | 3M Company |
| HFPO oligomer diacrylate | $CH_2$=$CHC(O)O$—$H_2C$—$(CF_3)CF$—$[OCF_2(CF_3)CF]_s$—$O(CF_2)_uO$—$[CF(CF_3)CF_2O]_t$—$CF(CF_3)$—$CH_2$—$OC(O)CH$=$CH_2$ | | Prepared according to the synthetic method generally described in U.S. Pat. No. 9,718,961. (PFE-3) |
| LTM diacrylate | $H_2C$=$CHC(O)OCH_2(CF_2O)_n(CF_2CF_2O)_nCH_2OC(O)CH$=$CH_2$ | | Prepared according to the synthetic method generally described in U.S. Pat. No. 9,718,896 |
| TFT | 1,1,1-trifluorotoluene | | Sigma-Aldrich |
| K90 | (2-(3-trimethoxy silylpropylcarbamoyloxy) ethyl prop-2-enoate | | 3M Company |
| Darocur 1173 | 2-Hydroxy-2-methylpropiophenone | | BASF |

Preparative Examples of Fluorinated Photoinitiators

Preparative Example 1

Pentafluorobenzoyl Methoxyphenylphosphine Oxide

The following reaction scheme was used to prepare Preparative Example 1:

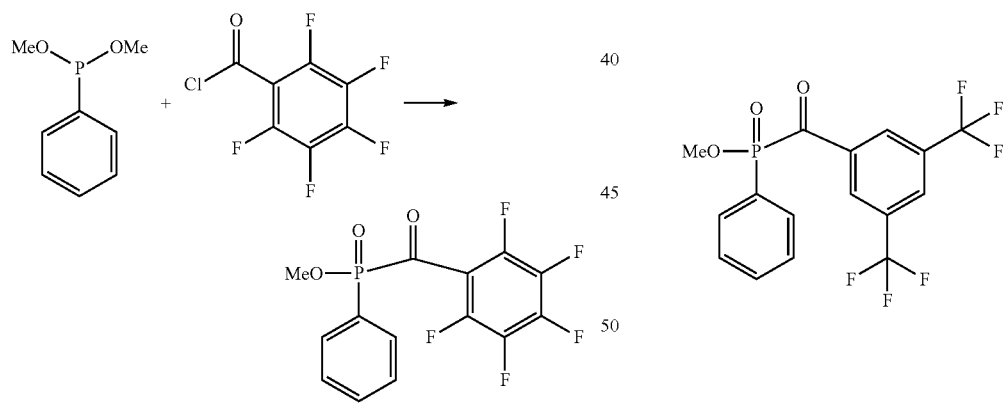

Pentafluorobenzoyl methoxyphenylphosphine oxide was synthesized under yellow ambient light under vacuum in a flame-dried 3-neck roundbottom flask fitted with thermocouple, magnetic stir bar, and liquid addition funnel. The roundbottom flask was back-filled with dry nitrogen and charged with 9.92 g (58.3 mmol) dimethoxyphenylphosphine.

The liquid addition funnel was charged with 13.44 g (58.3 mmol) pentafluorobenzoyl chloride, and the reaction apparatus was connected to vacuum. The roundbottom flask was cooled with a dry ice/isopropanol bath and the pentafluorobenzoyl chloride was added dropwise at a rate sufficient to keep the reaction temperature under 15° C. During this time the reaction mixture became a bright yellowish-orange pourable-viscosity oil. Pentafluorobenzoyl methoxyphenylphosphine oxide was collected in quantitative yield and stored in a brown glass jar. H-NMR confirmed reaction product.

Preparative Example 2

Bis-Trifluoromethylbenzoyl Methoxyphenylphosphine Oxide

The following reaction scheme was used to prepare Preparative Example 2:

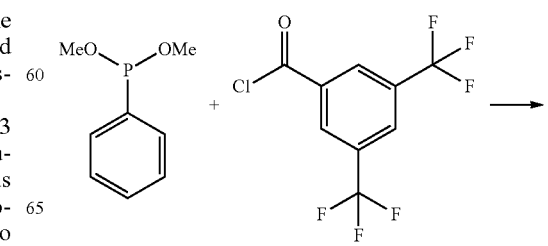

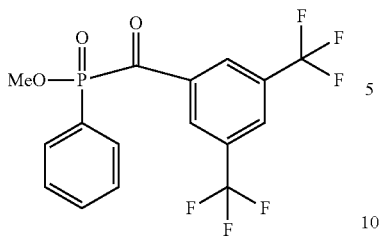

Bis-trifluoromethylbenzoyl methoxyphenylphosphine oxide was synthesized under yellow ambient light under vacuum in a flame-dried 3-neck roundbottom flask fitted with thermocouple, magnetic stir bar, and liquid addition funnel. The roundbottom flask was back-filled with dry nitrogen and charged with 9.54 g (56.1 mmol) dimethoxyphenylphosphine. The liquid addition funnel was charged with 15.51 g (56.1 mmol) bis-trifluoromethylbenzoyl chloride, and the reaction apparatus was connected to vacuum. The roundbottom flask was cooled with a dry ice/water bath and the trifluoromethylbenzoyl chloride was added dropwise at a rate sufficient to keep the reaction temperature under 15° C. During this time the reaction mixture became a light yellow and very sticky oil which inhibited continual magnetic stirring as the reaction progressed. Bis-trifluoromethylbenzoyl methoxyphenylphosphine oxide was collected in quantitative yield and stored in a brown glass jar. H-NMR confirmed reaction product.

Preparative Example 3

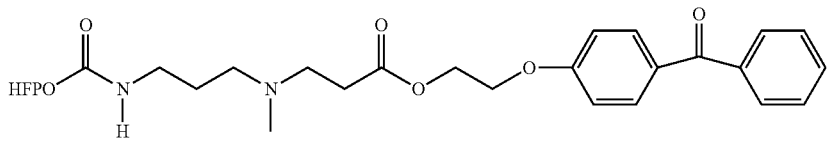

The following reaction scheme was used to prepare Preparative Example 3:

AEBP (296.31 MW, 0.05062 mol) and HFPO—C(O)NH—CH$_2$CH$_2$CH$_2$—NH(CH$_3$) 66.24 g (1246.15 number average MW, 0.0532 mol), were dissolved with heat in 90.2 g of ethyl acetate and 81.0 g of Novec 7200 in a 500 mL flask equipped with magnetic stir bar under dry air, and allowed to stir at room temperature overnight. An aliquot was removed for $^1$H FT-NMR and analysis showed that about 20-24 mole percent of olefin remained, and 20 mole percent more (13.25 g) HFPO—C(O)NH—CH$_2$CH$_2$CH$_2$—NH(CH$_3$) was added. After 3 additional days at room temperature, $^1$H FT-NMR and analysis showed that no olefin remained. To the reaction was added 0.169 g 4-hydroxy TEMPO (1790 ppm), and the reaction was concentrated at 35° C. to remove most of the Novec 7200, and then at up to 85° C. at 1.3 torr (slowly increasing vacuum to avoid foaming) to provide 92.9 g of a material that cooled to a soft gel.

In view of the additional of HFPO—[C(O)NH—CH$_2$CH$_2$CH$_2$—NH(CH$_3$)] required to react with one equivalent of AEBP, the stoichiometric equivalent weight of the HFPO—[C(O)NH—CH$_2$CH$_2$CH$_2$—NH(CH$_3$)] was determined to be 1570.20 g/mole. Therefore, the total molecular weight of the compound of Preparative Example 3 was 1866.51 g/mole and had 54.3% fluorine by weight.

Preparative Example 4

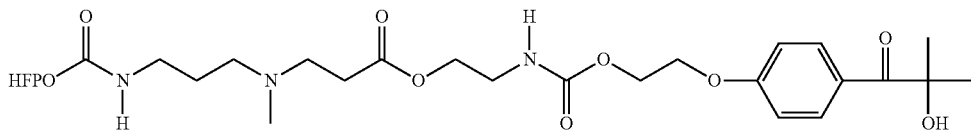

The following reaction scheme was used to prepare Preparative Example 4:

Preparation of Intermediate

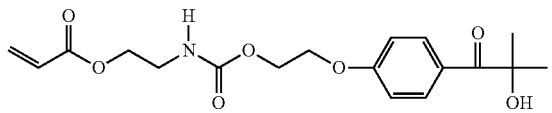 [SMILES: C=CC(=O)OCCNC(=O)OCCOc1ccc(C(=O)C(C)(C)O)cc1]

Irgacure 2959, 50.00 g (0.223 mol, 224.26 MW) was charged to a 250 mL flask equipped with stir bar, followed by 250.00 g of MEK under dry air. The Irgacure 2959 did not completely dissolve, and 0.0322 g (400 ppm based on total solids) BHT and 0.008 g (100 ppm based on total solids) 4-hydroxy TEMPO were added. Next, 30.52 g (0.216 mol, 141.12 MW) IEA was added via a pressure equalizing addition funnel, reaching a maximum temperature of 34° C. at about 40 min. Addition was complete at 1.75 h, at which time analysis of an aliquot showed a small —NCO peak at 2265 cm$^{-1}$. After stirring overnight, FTIR showed no —NCO peak. The material was concentrated at 45° C. under aspirator pressure for about 1.5 h, then at 50° C. for at 4 torr for about 30 min, yielding 81.74 g of a material that solidified to a white solid.

Preparation of Fluorinated Photoinitiator

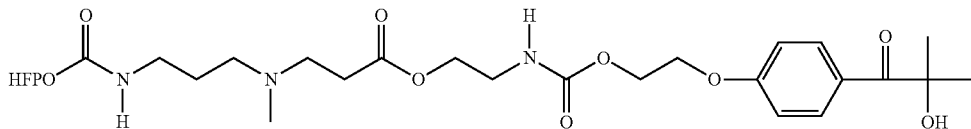

5.00 g of the above Intermediate (0.0137 mol, 365.38 MW), and 17.91 g (0.0144 mol, 1246.15 number average MW) HFPO—C(O)NH—CH$_2$CH$_2$CH$_2$—NH(CH$_3$), along with 25 g of Novec 7200 and 10 g ethyl acetate were added to a 100 mL flask equipped with stir bar under dry air. The reaction, initially cloudy, cleared after 2 h of mixing at room temperature. After 3 days of mixing at room temperature, analysis of an aliquot by $^1$H FT-NMR showed that about 5 mole percent olefin remained, and 0.95 g (0.00072 mol) HFPO—C(O)NH—CH$_2$CH$_2$CH$_2$—NH(CH$_3$) was added. After stirring overnight, $^1$H FT-NMR and analysis of an aliquot showed that no olefin remained. The reaction products were concentrated on a rotary evaporator for about 30 min at aspirator pressure and at 69° C. for about 30 min at 3 torr to yield 23.25 g of a material that solidified to a white solid.

In view of the additional of HFPO—[C(O)NH—CH$_2$CH$_2$CH$_2$—NH(CH$_3$)] required to react with one equivalent of AEBP, the stoichiometric equivalent weight of the HFPO—[C(O)NH—CH$_2$CH$_2$CH$_2$—NH(CH$_3$)] was determined to be 1377.88 g/mole. Therefore, the total molecular weight of the compound of Preparative Example 4 was 1743.26 g/mole had 50.5% fluorine by weight.

Ultraviolet-Visible (UV-VIS) Light Spectroscopy

UV-VIS spectra were collected for the fluorinated photoinitiators of Preparative Examples 1-4 using a PerkinElmer LAMBDA 365 UV/Vis spectrophotometer at a 10 mm pathlength, at 0.1 and 0.01 w/w % in acetonitrile versus an acetonitrile reference. These photoinitiators have strong UV absorption properties, and their absorption spectra tail into the visible (violet-blue) region of the spectrum, especially at higher concentrations. FIGS. 3-6 provide the measured UV-VIS absorption spectra for Preparative Examples 1-4.

Spectroscopic Ellipsometry

The deposited films were characterized by spectroscopic ellipsometry using a J. A. Woollam alpha-SE spectroscopic ellipsometer over a wavelength range of 381-893 nm. For films deposited on PET, prior to measurement the backside of the polymeric substrate was abraded with 3M 3M™ Wetordry™ Sandpaper, 1000 Grit (3M ID 60455088165) to scatter the light and suppress back surface reflections such that anisotropic effects from the PET are minimized, as described in J. N. Hilfiker, B. Pietz, et al., Spectroscopic ellipsometry characterization of coatings on biaxially anisotropic polymeric substrates, Appl. Surf. Sci. (2016). The sample was measured in Standard measurement mode and sample alignment. The deposited layer was modeled with Cauchy dispersion.

Spin-Coating Experiments

An evaluation of the curing effectiveness of the materials was done by spin-coating a mixture of HFPO diacrylate and the fluorinated photoinitiator material(s) at varying concentrations onto an unprimed PET substrate (Weinview SC-100, 3000 RPM, 10 sec). The HFPO diacrylate and fluorinated PI mixtures were diluted in a solvent (Novec 7200 or 1,1,1-trifluorotoluene, 1:4) to yield a "dry" thickness of approximately 1-2 microns. Immediately after spin-coating, the samples were transferred to a conveyor belt and exposed to UVC germicidal lamps (12) in a water-cooled, nitrogen-purged enclosure. The UVC lamps were allowed to warm up and stabilize for thirty minutes prior to dosimetry characterization and spin-coating.

UV dosimetry was completed using an EIT Power Puck II: the measured peak irradiance was 10 mW/cm$^2$, and a line speed of 7 fpm was chosen to yield a UVC dose of 54 mJ/cm$^2$. If the deposited film was not completely cured, as determined by the criteria listed in Table 2 below, the film was exposed again to the UVC light until the film was completely cured, or the film had not completely cured after six sequential passes. The UV curing conditions were chosen to be representative of conditions related to application or method purposes, and not necessarily chosen to match the photoinitiator UV-VIS absorption characteristics.

The curing effectiveness, or level of cure, was evaluated qualitatively according to the following criteria:

TABLE 2

Criteria Used to Evaluate the Qualitative Level of Curing of the Deposited Films

| Level of Cure | Explanation/Description |
| --- | --- |
| NO CURE (N) | deposited film is easily removed from substrate (completely liquid or substantially liquid) |
| PARTIAL CURE (P) | deposited film has solidified but is able to be removed or smudged (gel) |
| COMPLETE CURE (C) | deposited film is substantially solid and mechanically robust, not able to be removed or smudged (solid) |

The data evaluating the curing effectiveness is shown below in Table 3. Note that the concentration listed is relative to the total mass of the solution with the HFPO diacrylate (not including solvent), although it should also be noted that the concentration listed is for the starting solution and not necessarily representative of the final concentration in the deposited film after spin-coating. As a comparative example (control), when HFPO diacrylate is mixed with commercially available non-fluorinated photoinitiators (e.g. Darocur 1173), the solution phase separates and thus it is not possible to dispense a homogenous solution and the resulting coating remains uncured.

TABLE 3

Evaluation of the Curing Effectiveness of the Fluorinated Photoinitiators

| Photoinitiator | Concentration (w/w %) | UV PASS NUMBER (approx. 54 mJ/cm$^2$ UVC dose per pass) | | | | | |
| --- | --- | --- | --- | --- | --- | --- | --- |
| | | 1 | 2 | 3 | 4 | 5 | 6 |
| Preparative Example 1 | 0.47 | C | | | | | |
| | 1.1 | C | | | | | |
| Preparative Example 2 | 1.2 | N | N | N | P | P | C |
| | 2.2 | P | P | C | | | |
| | 5.0 | P | C | | | | |

TABLE 3-continued

Evaluation of the Curing Effectiveness of the Fluorinated Photoinitiators

| Photoinitiator | Concentration (w/w %) | UV PASS NUMBER (approx. 54 mJ/cm² UVC dose per pass) | | | | | |
|---|---|---|---|---|---|---|---|
| | | 1 | 2 | 3 | 4 | 5 | 6 |
| Preparative Example 3 | 2.8 | C | | | | | |
| | 7.6 | P | C | | | | |
| -Preparative Example 4 | 3.3 | C | | | | | |
| | 5.6 | C | | | | | |
| | 13.0 | C | | | | | |

The data in Table 3 shows differentiation of the curing effectiveness of the fluorinated photoinitiator materials. With the UV curing parameters investigated, Preparative Example 1, Preparative Example 3, and Preparative Example 4 gave the best curing effectiveness, yielding a completely cured film at concentrations less than 0.5 w/w % (referenced to the MW of the photoinitiator group). Preparative Example 2 gave intermediate curing effectiveness, needing a comparatively large dose to yield a completely cured film, or relatively high loadings (>5%).

Roll-to-Roll Vapor Deposition Experiments

Comparative Example 1

LTM diacrylate (a perfluoropolyether diacrylate similar in curing characteristics to HFPO oligomer diacrylate) without any additives was deposited onto a polyethylene terephthalate (PET) substrate film by an organic vapor deposition process similar to that described in U.S. Pat. No. 6,045,864 (Lyons et al.).

The layer was deposited as follows: A roll of 0.025 mm thick PET film was loaded into a roll-to-roll vacuum processing chamber, and the chamber was pumped down to a pressure of less than 10 mtorr. Prior to deposition, the LTM diacrylate was degassed under vacuum to a pressure of less than 100 mtorr and loaded into a stainless-steel syringe. Nitrogen was introduced into the chamber to maintain a pressure of about 150 mtorr.

Prior to deposition, the film surface was treated with a nitrogen DC magnetron plasma at a power of 100 W (Ti cathode). The film was translated through the chamber at a web speed varying between 5-10 fpm (discrete samples produced at different but constant web speeds). LTM diacrylate was then deposited on the film surface while the backside surface of the film was in contact with a backing roll cooled to 0° C.

The LTM diacrylate was pumped at flow rates varying from 0.50-1.50 mL/min (discrete samples produced at different but constant flow rates) through an ultrasonic atomizer into an evaporation chamber heated to 250° C. The diacrylate vapor was condensed onto the film surface and exposed to UVC lamps (6) (Heraeus mercury-amalgam low pressure, approximately 69-130 mJ/cm² (10 and 5 fpm, respectively)) to form a layer 250-1000 nm in thickness, dependent on the line speed and monomer flow rate.

The UVC germicidal lamps were maintained in a water-cooled housing, and the lamp temperature (indicative of the output) was stabilized between 75-85° C. Following deposition, the film was wound onto a core and later removed for sampling.

The deposited films, including all thicknesses investigated, were observed to be significantly under-cured (similar to the partial cure criteria introduced above in Table 2). The deposited films were not mechanically robust (i.e. easily abraded and rubbed away with a gloved finger), and/or significant transfer of the coating to the backside of the substrate was observed, indicative of an under-cured coating. The coatings were not able to be characterized by optical analysis methods, including ellipsometry, because of the fragile and discontinuous nature of the coating following roll sampling.

Comparative Example 2

HFPO oligomer diacrylate was deposited onto a polyethylene terephthalate (PET) substrate film by an organic vapor deposition process similar to that described in U.S. Pat. No. 6,045,864 (Lyons et al.). The HFPO oligomer diacrylate was blended with Darocur 1173 photoinitiator immediately prior to vaporization. The layer was deposited as follows:

A roll of 0.127 mm thick PET film (commercially available from DuPont, ST505) was loaded into a roll-to-roll vacuum processing chamber, and the chamber was pumped down to a pressure of less than 10 mtorr. A section of this roll was previously sputter-coated with a 25 nm layer of silicon aluminum oxide, which served as the substrate. Prior to deposition, the HFPO diacrylate and Darocur 1173 materials were separately degassed under vacuum to a pressure of less than 100 mtorr and loaded into two separate stainless-steel syringes.

Nitrogen was introduced into the chamber to maintain a pressure of about 200 mtorr. Prior to deposition, the film surface was treated with a nitrogen DC magnetron plasma at a power of 100 W (Ti cathode). The film was translated through the chamber at a web speed of 12.5 fpm.

The HFPO diacrylate solution was then deposited on the film surface while the backside surface of the film was in contact with a backing roll cooled to 0° C. The HFPO diacrylate solution was pumped at a flow rate of 2.00 mL/min, and the Darocur 1173 was pumped at a flow rate of 0.05 mL/min, and the two liquid streams were blended together immediately prior to an ultrasonic atomizer, and delivered through an ultrasonic atomizer into an evaporation chamber heated to 250° C. The HFPO diacrylate vapor and Darocur 1173 vapor was condensed onto the film surface and exposed to UVC lamps (6) (Heraeus mercury-amalgam low pressure, approximately 55 mJ/cm²) to form a layer approximately 1100 nm in thickness. The UVC germicidal lamps were maintained in a water-cooled housing, and the lamp temperature (indicative of the output) was stabilized between 75-85° C. Following deposition, the film was wound onto a core and later removed for sampling.

The deposited coating was observed to be substantially more cured than those described in Comparative Example 1 (similar to the complete cure criteria introduced above in Table 2).

No backside transfer of the deposited coating was observed. The deposited coatings were characterized by spectroscopic ellipsometry (JA Woollam alpha-SE) using a Cauchy dispersion model, and measured to have a thickness=1161 nm. This processing method has major disadvantages which the current disclosure solves. Experiments have shown limitations on the relative flow rates of the immiscible liquid streams, in which the deposited coating develops significant haze (believed to be a result of phase separation) if the ratio of the immiscible additive flow rate relative to the fluorinated acrylate flow rate is increased (level dependent on identity of additives), or as the deposited coating increases in thickness over 500 nm. This severely limits the available processing window (e.g. range of available flow rates, line speeds, film thickness) and the loading levels of additives which may be needed to improve inter-layer adhesion or curing, among other properties. Additionally, films deposited by this method are observed to be less mechanically robust than those deposited using the fluorinated photoinitiator materials described in this disclosure, which is described further in Example 1.

Example 1

HFPO oligomer diacrylate was deposited onto a polyethylene terephthalate (PET) substrate film by an organic vapor deposition process similar to that described in U.S. Pat. No. 6,045,864 (Lyons et al.). The HFPO oligomer diacrylate was mixed with an experimental amino-silane coupling agent Example 1-2 of 63/024,633, titled "POLYMERIZABLE COMPOSITIONS AND COMPOUNDS COMPRISING PERFLUORINATED GROUP, HYDROLYSABLE SILANE GROUP, AND (METH)ACRYL GROUP." which is not expected to have any significant effect on curing, and Preparatory Example 1 (1.0%). The layer was deposited as follows: A roll of 0.127 mm thick PET film (commercially available from DuPont, ST505) previously sputter-coated with a 25 nm layer of silicon aluminum oxide was loaded into a roll-to-roll vacuum processing chamber, and the chamber was pumped down to a pressure of less than 10 mtorr. Prior to deposition, the HFPO diacrylate solution was degassed under vacuum to a pressure of less than 100 mtorr and loaded into a stainless-steel syringe. Nitrogen was introduced into the chamber to maintain a pressure of about 150 mtorr. Prior to deposition, the film surface was treated with a nitrogen DC magnetron plasma at a power of 100 W (Ti cathode). The film was translated through the chamber at a web speed of 6 fpm. The HFPO diacrylate solution was then deposited on the film surface while the backside surface of the film was in contact with a backing roll cooled to 0° C. The HFPO diacrylate solution was pumped at a flow rate of 1.00 mL/min through an ultrasonic atomizer into an evaporation chamber heated to 250° C. The vapor was condensed onto the film surface and exposed to UVC lamps (6) (Heraeus mercury-amalgam low pressure, approximately 115 mJ/cm$^2$) to form a layer approximately 1100 nm in thickness. The UVC germicidal lamps were maintained in a water-cooled housing, and the lamp temperature (indicative of the output) was stabilized between 75-85° C. Following deposition, the film was wound onto a core and later removed for sampling.

The deposited film was observed to be well-cured (similar to the complete cure criteria introduced above in Table 2), and no backside transfer of the coating was observed. The deposited coating was characterized by spectroscopic ellipsometry (JA Woollam alpha-SE) to have an average thickness (cross-web)=1031 nm, refractive index=1.36±0.01 (at 550 nm, Cauchy parameters, A=1.359, B=0.0027), and no significant absorption (k<10$^{-3}$). This example demonstrates effective curing in a R2R configuration from a single homogenous solution, with no significant effect on the process efficiency (defined based on thickness and width of deposited coating relative to volumetric input rate, relative to Comparative Example 1) or the optical properties of the deposited film.

It was also observed that the deposited films cured with this photoinitiator material have improved mechanical properties relative to those deposited in Comparative Example 2, as exemplified by the coating deposited on the cooled backing roll (beyond the width of the film). With deposited films including Preparatory Example 1, the deposited coating on the backing roll was substantially a solid thin film, and was resistant to being removed by wiping with acetone or a fluorinated solvent (e.g. Novec 7200). With deposited films as in Comparative Example 2, the coating deposited on the cooled backing roll was softer and similar to a hydrated gel material (sticky and gummy), and was easily removed by wiping with acetone or a fluorinated solvent (e.g., Novec 7200).

Example 2

HFPO oligomer diacrylate was deposited onto a polyethylene terephthalate (PET) substrate film by an organic vapor deposition process similar to that described in U.S. Pat. No. 6,045,864 (Lyons et al.). The HFPO oligomer diacrylate was mixed with Preparatory Example 3 (15.6%). The layer was deposited as follows:

A roll of 0.127 mm thick PET film (commercially available from DuPont, ST505) previously sputter-coated with a 25 nm layer of silicon aluminum oxide was loaded into a roll-to-roll vacuum processing chamber, and the chamber was pumped down to a pressure of less than 10 mtorr. Prior to deposition, the HFPO diacrylate solution was degassed under vacuum to a pressure of less than 100 mtorr and loaded into a stainless-steel syringe. It was noted during mixing and degassing of the solution that the solution was relatively hazy in comparison to neat HFPO diacrylate but did not phase separate. Nitrogen was introduced into the chamber to maintain a pressure of about 200 mtorr. Prior to deposition, the film surface was treated with a nitrogen DC magnetron plasma at a power of 100 W (Ti cathode). The film was translated through the chamber at a web speed of 12.5 fpm. Prior to deposition of the HFPO diacrylate, a solution of 96% (2-(3-trimethoxysilylpropylcarbamoyloxy) ethyl prop-2-enoate, as described in Example 7 of U.S. Pat. No. 9,790,396) and 4% Darocur 1173 photoinitiator was deposited on the film surface as an optical and/or adhesion-promoting layer 20 while the backside surface of the film was in contact with a backing roll cooled to 0° C. The (2-(3-trimethoxysilylpropylcarbamoyloxy)ethyl prop-2-enoate solution was pumped at a flow rate of 0.10 mL/min through an ultrasonic atomizer into an evaporation chamber heated to 250° C. The vapor was condensed onto the film surface and exposed to UVC lamps (2) (Heraeus mercury-amalgam low pressure approximately 18 mJ/cm$^2$) to form a layer approximately 75 nm in thickness. The HFPO diacrylate solution was then deposited on the film surface while the backside surface of the film was in contact with a backing roll cooled to 0° C. The HFPO diacrylate solution was pumped at a flow rate of 2.00 mL/min through an ultrasonic atomizer into an evaporation chamber heated to 250° C. The vapor was condensed onto the film surface and exposed to UVC lamps (6) (Heraeus mercury-amalgam low pressure, approximately 55 mJ/cm$^2$) to form a layer approximately 1150 nm in thickness. The UVC germicidal lamps were maintained in a water-cooled housing, and the lamp temperature (indicative of the output) was stabilized between 75-85° C. Following deposition, the film was wound onto a core and later removed for sampling.

The deposited film was observed to be well-cured (similar to the complete cure criteria introduced above in Table 2), and no backside transfer of the coating was observed. The deposited coating was characterized by spectroscopic ellipsometry (JA Woollam alpha-SE) to have a thickness (center of web)=917 nm, refractive index=1.38±0.01 (at 550 nm, Cauchy parameters, A=1.36, B=0.044), and no significant absorption (k<10$^3$). The refractive index dispersion for Comparative Example 1, Example 1, and Example 2 are presented below as tabulated values in Table 4.

TABLE 4

Cauchy Parameters (Determined by Spectroscopic Ellipsometry) for Comparative Example 1, and Examples 1 and 2

|  | Comparative Example 1 | Example 1 | Example 2 |
|---|---|---|---|
| Cauchy Parameter A | 1.332 | 1.364 | 1.359 |
| Cauchy Parameter B | 0.0044 | 0.0044 | 0.0027 |
| Wavlength (nm) | Refractive Index | Refractive Index | Refractive Index |
| 400 | 1.36 | 1.39 | 1.38 |
| 425 | 1.36 | 1.39 | 1.37 |
| 450 | 1.35 | 1.39 | 1.37 |
| 475 | 1.35 | 1.38 | 1.37 |
| 500 | 1.35 | 1.38 | 1.37 |
| 525 | 1.35 | 1.38 | 1.37 |
| 550 | 1.35 | 1.38 | 1.37 |
| 575 | 1.35 | 1.38 | 1.37 |
| 600 | 1.34 | 1.38 | 1.37 |
| 625 | 1.34 | 1.38 | 1.37 |
| 650 | 1.34 | 1.37 | 1.37 |
| 675 | 1.34 | 1.37 | 1.37 |
| 700 | 1.34 | 1.37 | 1.36 |
| 725 | 1.34 | 1.37 | 1.36 |
| 750 | 1.34 | 1.37 | 1.36 |

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

The invention claimed is:

1. A multilayer optical film comprising:
   a substrate;
   at least a first optical layer overlaying a surface of the substrate, wherein the first optical layer comprises a (co) polymer obtained by polymerizing a polymerizable composition comprised of:
   at least one free-radically polymerizable monomer, oligomer, or mixture thereof, and
   at least one fluorinated photoinitiator having one of the following formulas:

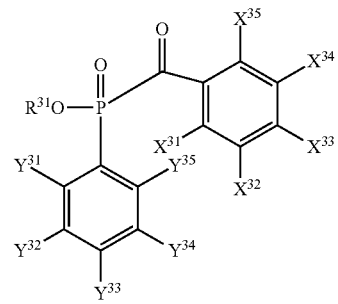

wherein:
   $X^{31}, X^{32}, X^{33}, X^{34}, X^{35}$ are each independently selected from —H, —F, or —CF$_3$, where at least 3 of $X^{31}$, $X^{32}, X^{33}, X^{34}, X^{35}$ are —F, or at least 1 of $X^{31}, X^{32}$, $X^{33}, X^{34}, X^{35}$ is —CF$_3$;
   $Y^{31}, Y^{32}, Y^{33}, Y^{34}, Y^{35}$ are each independently selected from —H, or CH$_3$; and
   $R^{31}$ is an alkyl group of 1 to 4 carbon atoms;

or $R_f$—[C(O)NH—$R^1$—N($R^2$)—CH$_2$CH$_2$—C(O)-λ-L-PI)]$_n$ wherein:
   $R_f$ is a monovalent perfluorooxyalkyl group or divalent perfluorooxyalkylene group;
   $R^1$ is an alkylene group optionally containing one or more catenary oxygen or nitrogen atoms,
   $R^2$ is H or an alkyl group of 1 to 4 carbon atoms,
   X is —O—, —S—, or —NR$^3$—, wherein R$^3$ is H or an alkyl group of 1 to 4 carbon atoms,
   L is a covalent bond or divalent organic linking group;
   PI is a photoinitiator group;
   n is 1 when $R_f$ is a monovalent perfluorooxyalkyl group or n is 2 when $R_f$ is a divalent perfluorooxyalkylene group,
   optionally wherein the polymerizable composition is comprised of the fluorinated photoinitiator in an amount of at least 0.1 wt. % based on a weight of the polymerizable composition.

2. The multilayer optical film of claim 1, further comprising at least one fluorinated coupling agent having one of the following formulas:

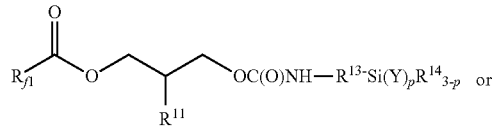

-continued

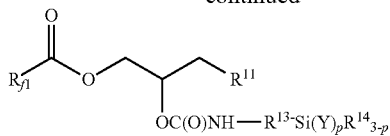

wherein:
$R_{f1}$ is a monovalent perfluorooxyalkyl;
$R^{13}$ is a divalent alkylene group, said alkylene groups optionally containing one or more catenary oxygen atoms;
$R^{11}$ is $-[OC(O)-NH-R^{13}]_{m1}OC(O)CR^{15}=CH_2$ or $-OC(O)-NH-R^{16}(-OC(O)CR^{15}=CH_2)_2$;
Y is a hydrolysable group;
$R^{14}$ is a monovalent alkyl or aryl group;
p is 1, 2, or 3;
$R^{15}$ is H or $CH_3$;
$R^{16}$ is a polyvalent alkylene group, said polyvalent alkylene group optionally containing one or more catenary oxygen atoms; and
m1 is 1 or 0; or

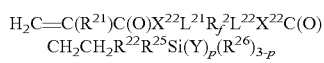

wherein:
$R^{21}$ is H or $CH_3$;
$X^{22}$ is $-O-$, $-S-$, or $-NR^{23}-$ wherein $R^{23}$ is H or an alkyl group of 1 to 4 carbon atoms,
$L^{21}$ and $L^{22}$ are organic linking groups;
$R_f^2$ is a divalent perfluorooxyalkylene;
$R^{22}$ is $-S-$ or $-N(R^{24})-$ wherein $R^{24}$ is $C_1$-$C_4$ alkyl or $-R^{25}Si(Y)_3$;
$R^{25}$ is a divalent alkylene group optionally comprising one or more catenary oxygen atoms;
Y is a hydrolysable group;
$R^{26}$ is a non-hydrolysable group; and
p is 1, 2, or 3; or

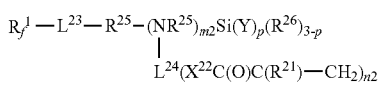

wherein:
$R_f^1$ is a monovalent perfluorooxyalkyl;
$L^{23}$ and $L^{24}$ are organic linking groups;
$R^{25}$ is a divalent alkylene group said alkylene groups optionally containing one or more catenary oxygen atoms;
Y is a hydrolysable group;
$R^{26}$ is a non-hydrolysable group;
p is 1, 2, or 3;
$X^{22}$ is $-O-$, $-S-$, or $-NR^{23}-$, wherein $R^{23}$ is H or an alkyl group of 1 to 4 carbon atoms;
$R^{21}$ is H or $CH_3$;
m2 is 1 or 2; and
n2 is 1, 2, or 3.

3. The multilayer optical film of claim 1, wherein the free-radically polymerizable monomer, oligomer, or combination thereof is fluorinated.

4. The multilayer optical film of claim 1, wherein the free-radically polymerizable monomer, oligomer, or combination thereof has a fluorine content of at least 25 wt. %.

5. The multilayer optical film of claim 1, wherein the polymerizable composition comprises a fluorinated oligomer including a perfluorooxyalkylene group.

6. The multilayer optical film of claim 1, wherein the polymerizable composition is comprised of the fluorinated photoinitiator of the formula:

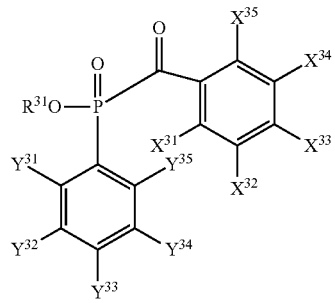

in an amount no more than about 10.0 wt. % based on the weight of the polymerizable composition.

7. The multilayer optical film of claim 1, wherein the fluorinated photoinitiator of formula:

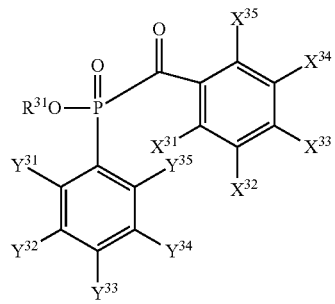

has a calculated molecular weight of no greater than 700 g/mole.

8. The multilayer optical film of claim 1, wherein the polymerizable composition is comprised of the fluorinated photoinitiator $R_f-[C(O)NH-R^1-N(R^2)-CH_2CH_2-C(O)-X-L-PI)]_n$ in an amount no more than about 50.0 wt. % based on the weight of the polymerizable composition.

9. The multilayer optical film of claim 1, wherein the fluorinated photoinitiator $R_f-[C(O)NH-R^1-N(R^2)-CH_2CH_2-C(O)-X-L-PI)]_n$ has a calculated number average molecular weight of no greater than 3000 g/mole.

10. The multilayer optical film of claim 1, wherein the fluorinated photoinitiator $R_f-[C(O)NH-R^1-N(R^2)-CH_2CH_2-C(O)-X-L-PI)]_n$ has a fluorine content of at least 30 wt. %.

11. The multilayer optical film of claim 1, further comprising at least one (meth)acrylic oligomer having the structure $CH_2=CHC(O)O-H_2C-(CF_3)CF-[OCF_2(CF_3)CF]_s-O(CF_2)_uO-[CF(CF_3)CF_2O]_t-CF(CF_3)-CH_2-OC(O)CH=CH_2$, wherein u is from 2 to 6 and s and t are independently integers of 2 to 25.

12. The multilayer optical film of claim 1, further comprising at least one additional optical layer adjoining the at least first optical layer.

13. The multilayer optical film of claim 12, further comprising a plurality of alternating optical layers comprised of:

a high refractive index optical layer overlaying the substrate and comprising an inorganic oxide, nitride, oxynitride, oxycarbide a metal or metal alloy; a (co) polymer, or a combination thereof; and an adjoining optical layer overlaying the substrate and comprising a (co) polymer.

14. The multilayer optical film of claim 1, wherein the substrate comprises a flexible transparent polymeric film.

15. The multilayer optical film of claim 12, wherein the at least first optical layer exhibits a refractive index, wherein the at least one additional optical layer adjoining the at least first optical layer exhibits a refractive index different from the refractive index of the first optical layer, and wherein the at least first optical layer has a refractive index of less than 1.4.

16. The multilayer optical film of claim 12, wherein the at least first optical layer exhibits a refractive index, wherein the at least one additional optical layer adjoining the at least first optical layer exhibits a refractive index different from the refractive index of the first optical layer, and wherein the at least one additional optical layer adjoining the at least first optical layer has a refractive index of at least 1.4.

17. An article incorporating the multilayer optical film according to claim 1, wherein the article is selected from a photovoltaic device, a display device, a solid-state lighting device, a sensor, a medical or biological diagnostic device, or a combination thereof.

18. A process for making a multilayer optical film according to claim 1, comprising:

forming at least one (co) polymer layer overlaying a major surface of a substrate, wherein the (co) polymer layer is a reaction product of the polymerizable composition of claim 1, optionally wherein the polymerizable composition is comprised of the fluorinated photoinitiator in an amount of at least 0.1 wt. % based on the weight of the polymerizable composition; and applying at least one high refractive index optical layer overlaying a major surface of the substrate.

19. The process of claim 18, wherein forming the at least one (co) polymer layer further comprises:

evaporating the polymerizable composition;

condensing the evaporated polymerizable composition as a layer overlaying the substrate; and reacting the polymerizable composition in the layer to form the (co) polymer, optionally wherein the method is carried out using a roll of the substrate in a substantially continuous roll-to-roll process.

20. The process of claim 18, wherein applying the at least one optical layer comprises depositing at least one of a metal oxide, metal oxide precursor, metal, metal precursor, (meth) acrylic (co) polymer, meth (acrylic (co) polymer precursor, or a combination thereof, onto the substrate to form the optical layer, wherein depositing is achieved using sputter deposition, reactive sputtering, thermal evaporation, electron-beam evaporation, chemical vapor deposition, plasma-assisted chemical vapor deposition, atomic layer deposition, plasma-assisted atomic layer deposition, organic vapor deposition, or a combination thereof.

* * * * *